(12) United States Patent
Gray et al.

(10) Patent No.: US 8,498,733 B2
(45) Date of Patent: Jul. 30, 2013

(54) METHOD AND APPARATUS FOR REDUCING TOOL CHANGE OPERATIONS

(75) Inventors: Paul J. Gray, Zionsville, IN (US); Karl Szabo, Fishers, IN (US)

(73) Assignee: Hurco Companies, Inc., Indianapolis, IN (US)

( * ) Notice: Subject to any disclaimer, the term of this patent is extended or adjusted under 35 U.S.C. 154(b) by 360 days.

(21) Appl. No.: 12/568,113

(22) Filed: Sep. 28, 2009

(65) Prior Publication Data

US 2011/0077762 A1 Mar. 31, 2011

(51) Int. Cl.
*G05B 19/18* (2006.01)

(52) U.S. Cl.
USPC .......................................... 700/179; 700/172

(58) Field of Classification Search
USPC .......................................... 700/172, 173, 179
See application file for complete search history.

(56) References Cited

U.S. PATENT DOCUMENTS

| | | | |
|---|---|---|---|
| 4,445,182 A | 4/1984 | Morita et al. | |
| 4,472,783 A | 9/1984 | Johnstone et al. | |
| 4,696,091 A | 9/1987 | Kitamura | |
| 4,750,105 A | 6/1988 | Ohkawa et al. | |
| 4,823,255 A | 4/1989 | Tanaka et al. | |
| 4,835,700 A * | 5/1989 | Tanaka et al. | 700/181 |
| 4,884,373 A | 12/1989 | Suzuki et al. | |
| 4,907,164 A | 3/1990 | Guyder | |
| 4,928,221 A | 5/1990 | Belkhiter | |
| 5,005,135 A | 4/1991 | Morser et al. | |
| 5,239,477 A | 8/1993 | Matsumura et al. | |
| 5,283,750 A | 2/1994 | Seki et al. | |
| 5,369,870 A | 12/1994 | Ouchi et al. | |
| 5,816,987 A | 10/1998 | Yan et al. | |
| 5,933,353 A * | 8/1999 | Abriam et al. | 700/182 |
| 6,090,025 A | 7/2000 | Matsuoka et al. | |
| 6,502,007 B1 * | 12/2002 | Kanamoto et al. | 700/173 |
| 7,103,955 B2 | 9/2006 | Murai et al. | |
| 2002/0025758 A1 | 2/2002 | Sei et al. | |
| 2006/0033256 A1 | 2/2006 | Kobayashi | |
| 2006/0173572 A1 | 8/2006 | Sagasaki et al. | |

OTHER PUBLICATIONS

Ho, Feature-Based Process Planning and Automatic Numerical Control Part Programming, Department of Computer Science, The University of Utah, Dec. 1997 (188 pp.).
Yang, Conversational Programming on CNCs, GE Fanuc Automation (14 pp.).
Mazak, Programming Manual for Mazatrol Fusion 640M, Publication #H735PG0011E, Jan. 1999 (14 pp.).

* cited by examiner

*Primary Examiner* — Ryan Jarett
(74) *Attorney, Agent, or Firm* — Faegre Baker Daniels LLP

(57) ABSTRACT

A method and system are provided which reorders a sequence of operations of a part program to reduce the number of tool changes during execution of the program. The reordered sequence maintains a sequence of at least a first portion of the operations.

17 Claims, 24 Drawing Sheets

METHOD AND APPARATUS FOR REDUCING TOOL CHANGE OPERATIONS

FIELD OF THE INVENTION

The present invention relates to the control of machine tool systems, and more particularly, to the modification of machine tool instructions to reduce the number of tool change operations required to machine a part.

BACKGROUND

Often times a machine tool program is written as an NC program expressed in a standard G&M code language, or a close derivative of this language based on either the International Standards Organization (ISO) or the Electronics Industries Association (EIA) RS-274-D, using codes identified by letters such as G, M, and F. The codes define a sequence of machining operations to control motion of the machine tool in the manufacture of a part.

Hurco Companies, Inc., the assignee of the present application, has offered a conversational style programming suite whereby a machine tool operator is able to program a machine tool mill or lathe system to perform various operations through a graphical user interface. The conversational style programming suite provides a feature based approach that allows an operator to define the geometry of a part. An exemplary software package and user interface is the WINMAX brand system available from Hurco Companies, Inc. One exemplary conversational programming system is disclosed in U.S. Pat. No. 5,453,933, the disclosure of which is expressly incorporated by reference herein.

Referring to FIG. 1, in the prior art Hurco system, an operator through a user interface specifies parameters for a plurality of conversational blocks which define feature geometry, as represented by block 2. Referring to FIG. 2, a given conversational block 12 includes one or more operations 14; illustratively operations 16, 18, and 20 are shown.

Referring to FIG. 3, each operation 14 specifies geometry information 22, tool information 24, speed information 26, peck information 28, and surface finish information 30. Geometry information specifies the desired geometry to create on the part, such as location of a hole and depth of a hole. Tool information 24 specifies the tool to be used to create the geometry. Speed information 26 specifies spindle rotational speed. Peck information 28 specifies maximum depth to cut for a specified tool.

Conversational block 42 is a frame block. Frame blocks specify a rectangular shape with or without a corner radius. The operator specifies the type of machine operation to be performed on the frame and the tools required for the machining. Frame block 42 includes a roughing operation 50 and a finishing operation 52. It is noted in FIG. 4, that roughing operation 50 is to use Tool 1 and that finishing operation 52 is to use Tool 3. Conversational block 44 is a circle block. Circle blocks specify a circular shape to be machined. The operator specifies the radius of the circle, the type of machining operation to be performed, and the tools required for the machining. Circle block 44 includes a roughing operation 54 and a finishing operation 56. It is noted in FIG. 4, that roughing operation 54 is to use Tool 1 and that finishing operation 56 is to use Tool 2. Conversational block 46 is a contour block. Contour blocks specify a series of line and arc segments. The operator specifies the type of machining operation to be performed and the tools required for the machining. Contour block 46 includes a roughing operation 58 and a finishing operation 60. It is noted in FIG. 4, that roughing operation 58 is to use Tool 1 and that finishing operation 60 is to use Tool 3. Conversational block 48 is a pattern block. Pattern blocks specify the number of instances and locations for at least one other block. For example, if an operator wanted to specify a plurality of holes for the part, the operator may specify the geometry of an instance of the hole through one or more conversational blocks and then with a pattern block create multiple instances of the geometry of the hole at various locations on the part. In connection with pattern block 48, three instances of the frame block 42, the circle block 44, and the contour block 46 are to be created. Blocks 42, 44, and 46 are nested within pattern block 48. It is possible to have multiple layers of nesting, such as a pattern block within a pattern.

Returning to FIG. 1, the machine tool control software takes the plurality of conversational blocks specified by the operator and generates a working set from the plurality of conversational blocks, as represented by block 4. The working set consists of breaking all of the operations out into a program sequence. The working set is converted by the machine tool control software into a tool path based on the geometry specified in each block of the working set. The tool path is then used to control the relative movement of a machine tool and a part being machined.

An exemplary working set 70 is shown FIG. 5. Referring to FIG. 5, each roughing operation and finishing operation is broken out and the operations are repeated for the patterned features. As mentioned at the bottom of FIG. 5, this results in seventeen tool changes. These tool changes take extra time in the machining of the part.

A need exists for reducing the number of tool changes in a defined part program to reduce cycle time. A defined part program is defined as a program which includes instructions that specify the tool path of a machine tool apparatus and instructions that specify which tool to use for each portion of the tool path. The defined part program may be generated through a conversational programming interface, such as described above, an NC program programming interface, or any other programming interface by which the parameters of a defined part program are specified. The working set of FIG. 5 is one example of a defined part program.

SUMMARY

In an exemplary embodiment of the present disclosure, a method of reducing the number of tool change operations during the execution of a part program by a machine tool system is provided.

In an exemplary embodiment of the present disclosure, a method of programming a machine tool system is provided. The method including the step of receiving a defined part program which includes a plurality of operation sets. Each operation set including a plurality of operations. Each operation specifies a tool path for the operation and a tool for the operation. A sequential execution of the defined part program by the machine tool system requires a first number of tool changes. The method further includes the step of determining a second execution sequence of the operations to require a second number of tool changes by the machine tool system. The second number of tool changes being less than the first number of tool changes. In the second execution sequence an execution order of the plurality of operations within a first operation set is maintained as provided in the defined part program, an execution order of the plurality of operations within a second operation set is maintained as provided in the defined part program, and at least one operation from the second operation set is executed subsequent to a first operation of the first operation set and prior to a second operation of the first operation set. The method further including the step of controlling the machine tool system to execute the second execution sequence of the operations, wherein the machine tool system performs the second number of tool changes during the execution of the reordered execution of the operations. In one example, the defined part program includes instructions regarding the reordering of the operations. In another example, the method further includes the step of storing the second execution sequence of the operations are stored in a part file.

In still another example, each of the plurality of operations belong to one of a plurality of operation types. In a refinement thereof, a tool change reduction instruction is provided for each one of the plurality of operation types. In a further refinement thereof, for a first operation type, the tool change reduction instruction is set to a first value and for a second operation type, the tool change reduction instruction is set to a second value differing from the first value. In yet a further refinement thereof, the first value requires an execution order of the operations which are of the first operation type to be performed in the order presented in the defined part program and the second value permits an execution order of the operations which are of the second operation type to be performed in an order other than the order presented in the defined part program. In still a further refinement thereof, the first operation type is one of a roughing operation, a semi-finish operation, and a finish operation.

In another exemplary embodiment of the present disclosure, a method of programming a machine tool system is provided. The method comprising the steps of receiving a first group of operations, a plurality of operations in the first group of operations each including path information and tool information, the plurality of operations including a first operation and a second operation; receiving a second group of operations, a plurality of operation in the second group of operations each including path information and tool information, the plurality of operations including a first operation and a second operation; and controlling the machine tool system to perform the plurality of operations of the first group of operations and the plurality of operations of the second group of operations. At least one of the first operation and the second operation of the plurality of operations of the second group of operations is performed subsequent to the first operation of the plurality of operations of the first group of the operations and prior to the second operation of the plurality of operations of the first group of operations. In one example, the tool information for each operation of the first group of operations and the tool information for each operation of the second group of operations specifies a tool for use with the respective operation, the tool being specified for each operation being the tool used when that operation is performed by the machine tool system. In another example, an execution order of the operations of the first group of operations is maintained and an execution order of the operations of the second group of operations is maintained.

In still another exemplary embodiment of the present disclosure, a computer readable medium is provided. The computer readable medium having stored thereon a first group of operations, a plurality of operations in the first group of operations each including path information and tool information, the plurality of operations including a first operation and a second operation; a second group of operations, a plurality of operation in the second group of operations each including path information and tool information, the plurality of operations including a first operation and a second operation; and software which controls a machine tool system to perform the plurality of operations of the first group of operations and the plurality of operations of the second group of operations. At least one of the first operation and the second operation of the plurality of operations of the second group of operations is performed subsequent to the first operation of the plurality of operations of the first group of the operations and prior to the second operations of the plurality of operations of the first group of operations. In one example, the tool information for each operation of the first group of operations and the tool information for each operation of the second group of operations specifies a tool for use with the respective operation, the tool being specified for each operation being the tool the software specifies be used when that operation is performed by the machine tool system. In another example, the software maintains an execution order of the operations of the first group of operations and maintains an execution order of the operations of the second group of operations.

In yet still another exemplary embodiment of the present disclosure, a computer readable medium is provided. The computer readable medium having stored thereon a defined part program which includes a plurality of operation sets, each operation set including a plurality of operations, each operation specifying a tool path for the operation and a tool for the operation, wherein a sequential execution of the defined part program by the machine tool system requires a first number of tool changes; software to determine a second execution sequence of the operations to require a second number of tool changes by the machine tool system, the second number of tool changes being less than the first number of tool changes, wherein in the second execution sequence an execution order of the plurality of operations within a first operation set is maintained as provided in the defined part program, an execution order of the plurality of operations within a second operation set is maintained as provided in the defined part program, and at least one operation from the second operation set is executed subsequent to a first operation of the first operation set and prior to a second operation of the first operation set; and software to control the machine tool system to execute the second execution sequence of the operations. In one example, the defined part program includes instructions regarding the reordering of the operations. In a refinement thereof, the instructions regarding the reordering of the operations includes a first set of instructions and a second set of instructions. The first set of instructions relating to a first group of the plurality of operation sets and the second set of instructions relating to a second group of the plurality of operation sets. In another example, each of the plurality of operations belong to one of a plurality of operation types and wherein a tool change reduction instruction is provided for each one of the plurality of operation types. In a refinement thereof, for a first operation type, the tool change reduction instruction is set to a first value and for a second operation type, the tool change reduction instruction is set to a second value differing from the first value and wherein the software interprets the first value to require an execution order of the operations which are of the first operation type to be performed in the order presented in the defined part program and the second value to permit an execution order of the operations which are of the second operation type to be performed in an order other than the order presented in the defined part program. Instill another example, the second execution sequence of the operations are stored in a part file.

Additional features and advantages of the present invention will become apparent to those skilled in the art upon consideration of the following detailed description of the illustrative embodiments exemplifying the best mode of carrying out the invention as presently perceived.

BRIEF DESCRIPTION OF THE DRAWINGS

A detailed description particularly refers to the accompanying figures in which.

Corresponding reference characters indicate corresponding parts throughout the several views.

DETAILED DESCRIPTION OF THE DRAWINGS

The embodiments disclosed herein are not intended to be exhaustive or limit the invention to the precise form disclosed in the following detailed description. Rather, the embodiments are chosen and described so that others skilled in the art may utilize the teachings.

Figure 1:
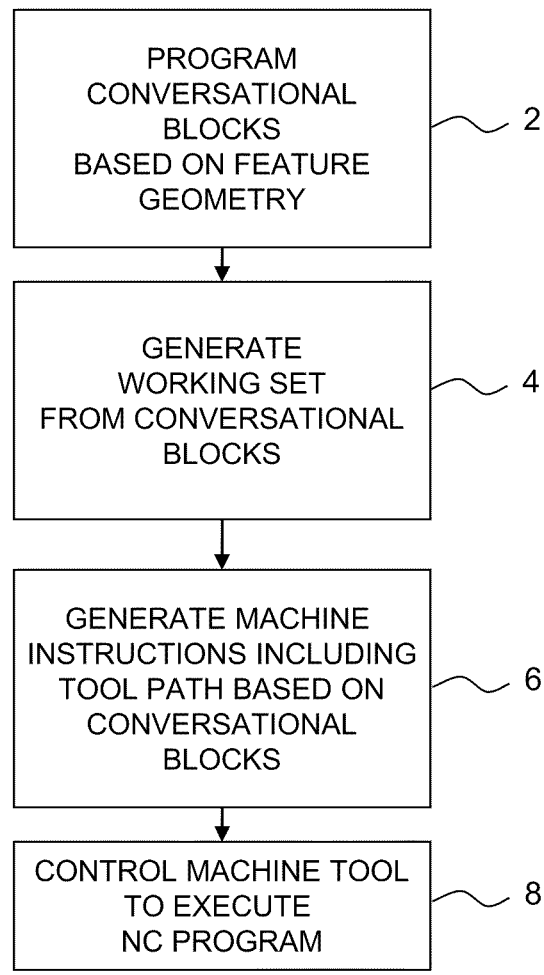
FIGS. 1-5 illustrate a prior art processing of conversational blocks to machine a part.
Figure 2:
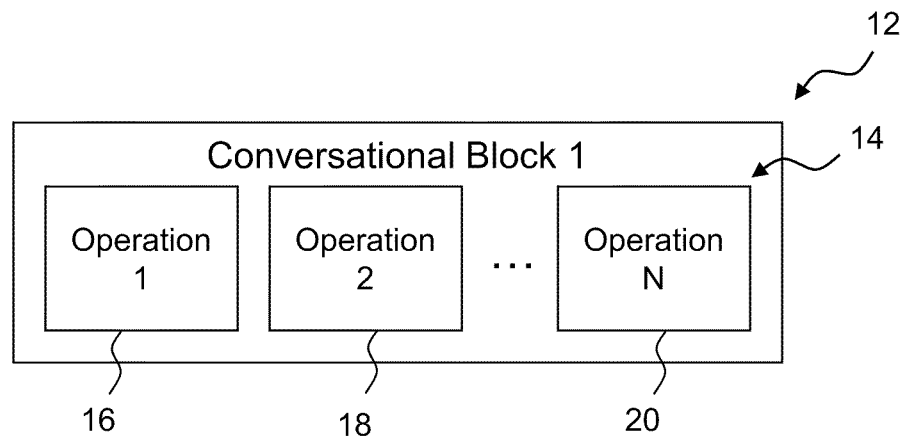
Figure 3:
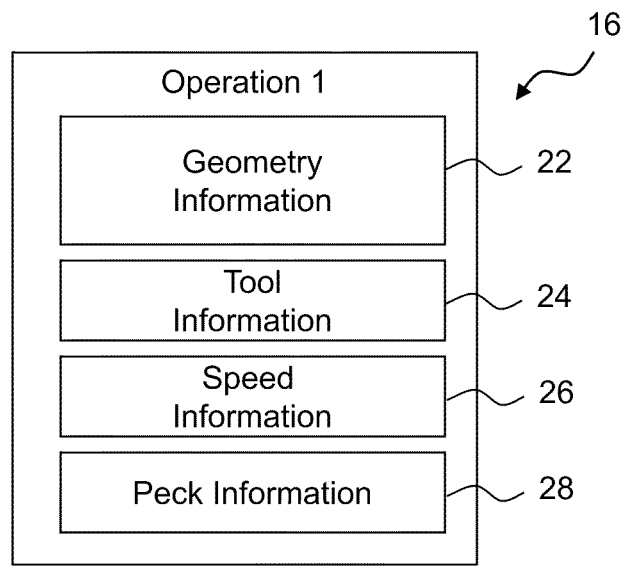
Figure 4:
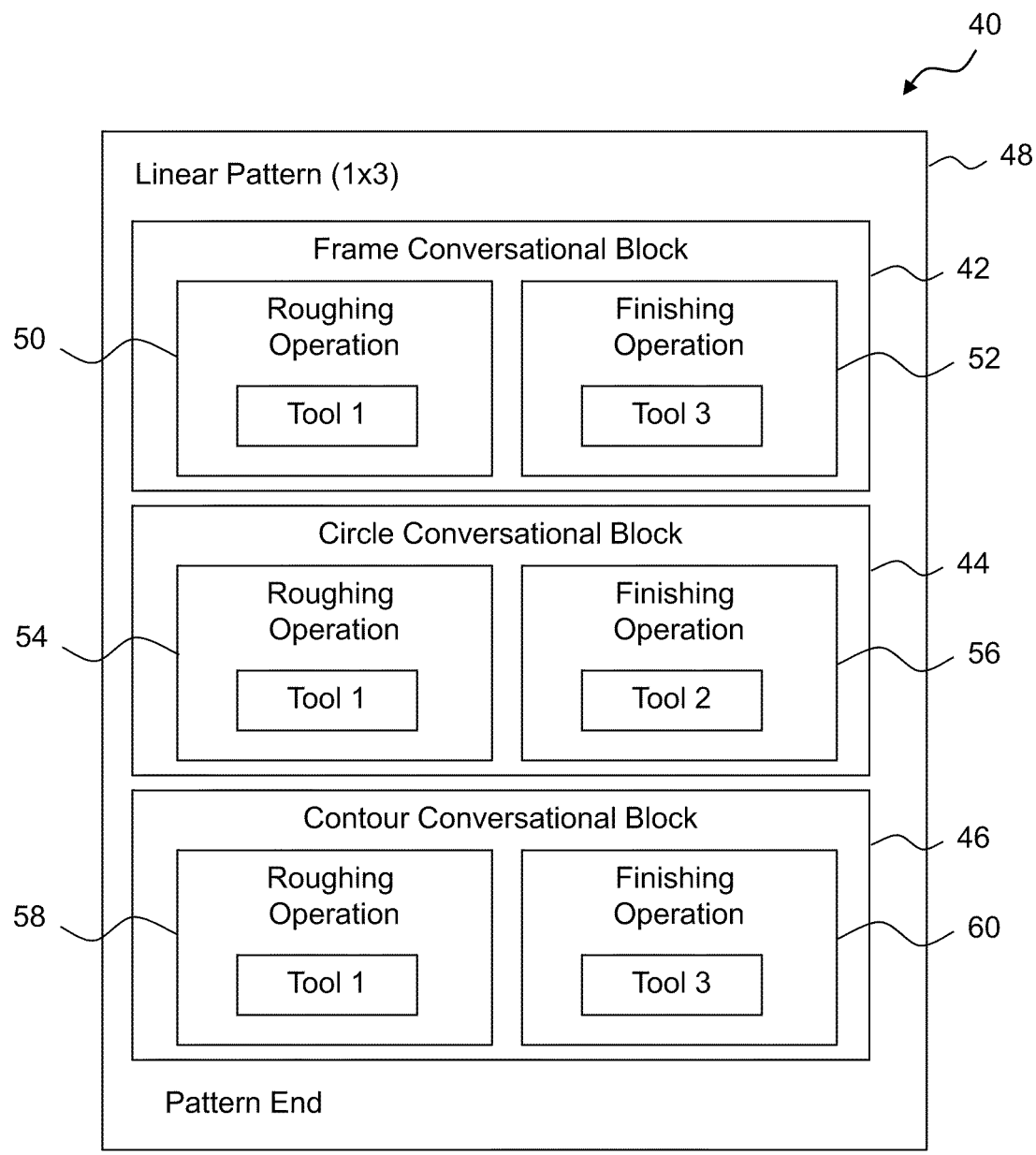
Figure 5:
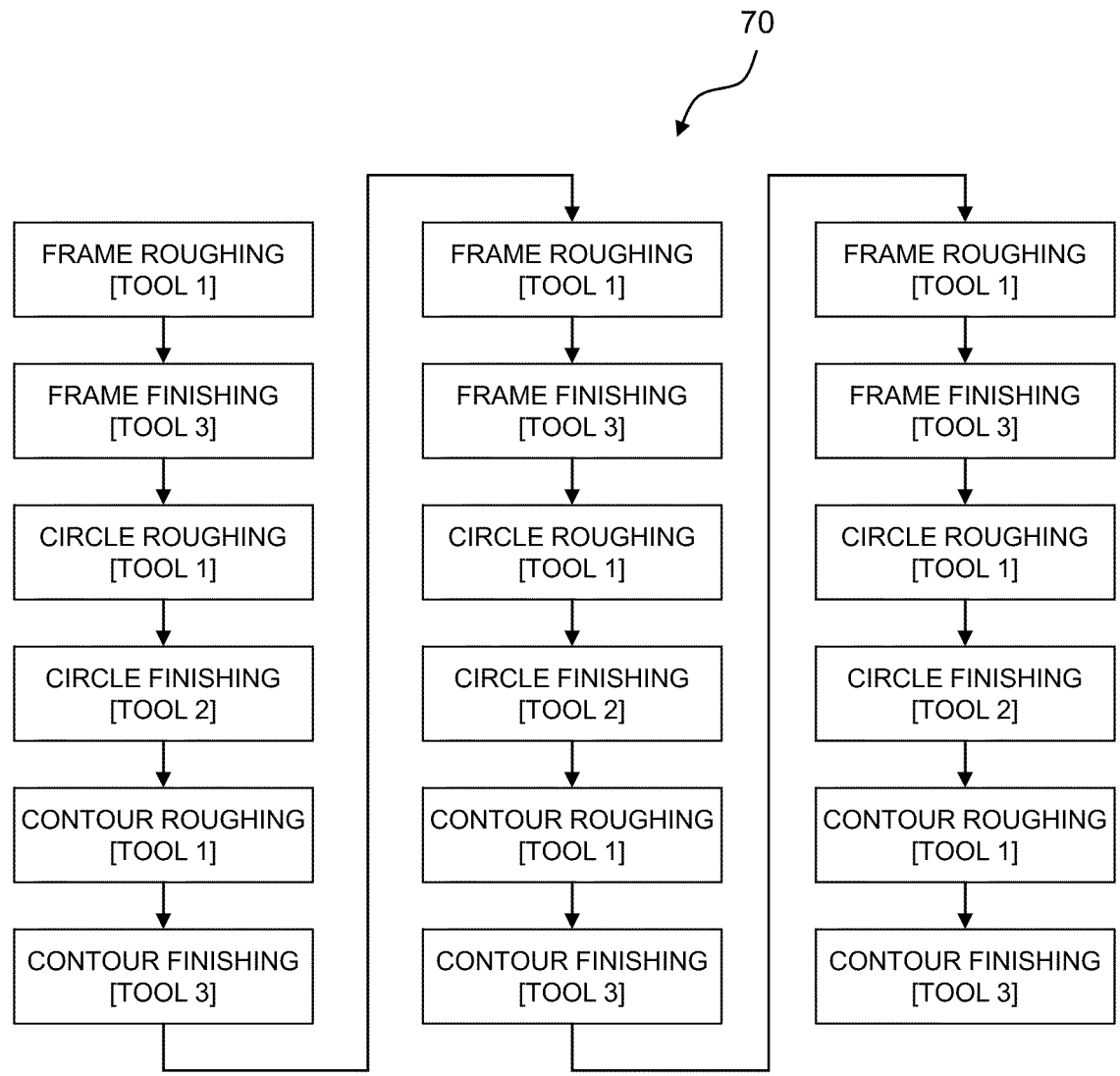
Figure 6:
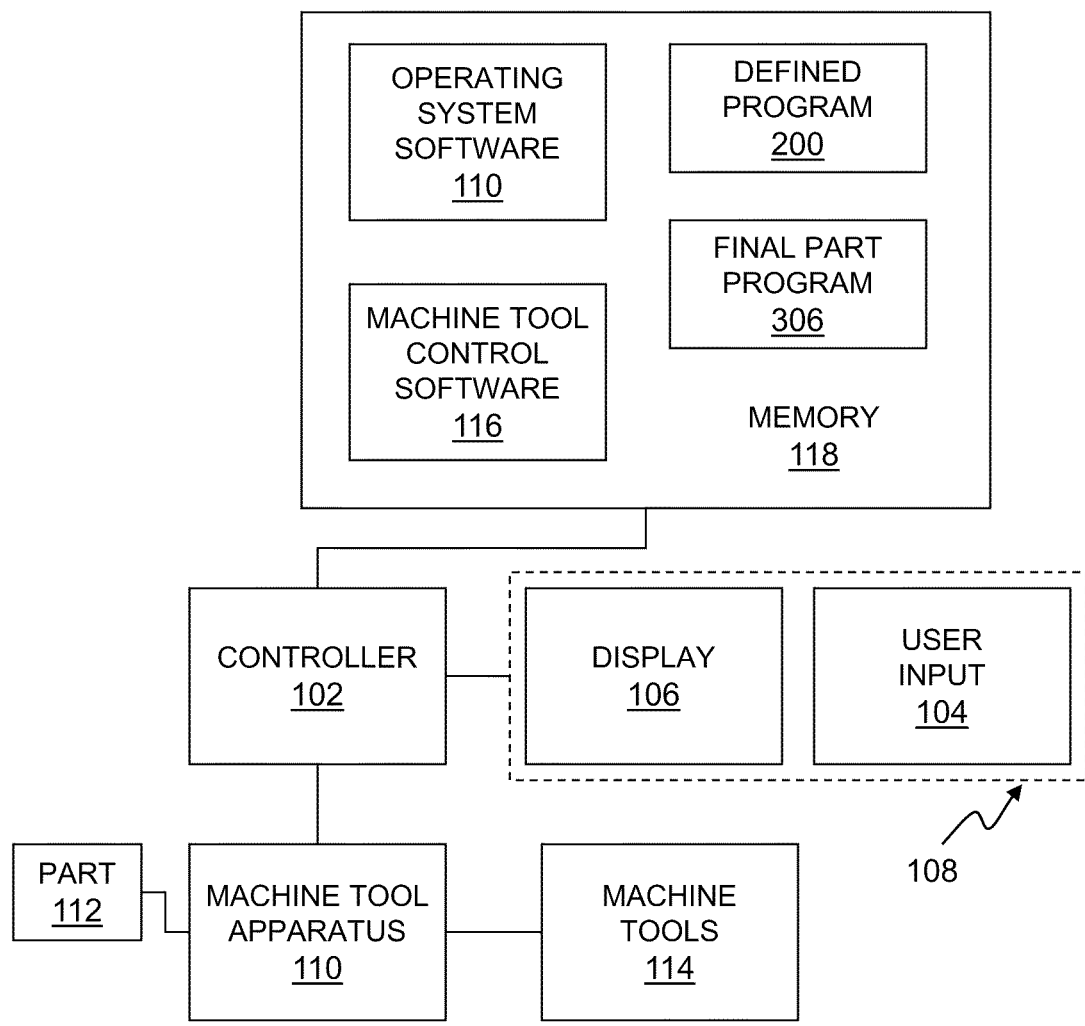
FIG. 6 illustrates an exemplary machine tool system.

Referring to FIG. 6, an exemplary representation of a machine tool system 100 is shown. Machine tool system 100 includes a controller 102. Controller 102 interfaces with user input devices 104 and display devices 106. User input devices 104 and display devices 106 are collectively shown as a user interface 108. Exemplary user interfaces include the MAX Single Screen Control console and the ULTIMAX Dual Screen Control console both available from Hurco Companies, Inc. located in Indianapolis, Ind., the assignee of the present application.

Controller 102 is further coupled to a machine tool apparatus 110 which supports a part 112 to be machined with one or more machine tools 114. Exemplary machine tool apparatus 110 include the vertical machining centers, the horizontal machining centers, the 5-axis machining centers, and the turning centers available from Hurco Companies, Inc. located in Indianapolis, Ind., the assignee of the present application. During the machining of part 112, the machine tool apparatus 110 will make multiple tool changes wherein a first tool is removed from the spindle of the machine tool apparatus 110 and a second tool is coupled to the spindle of machine tool apparatus 110.

Figure 7:
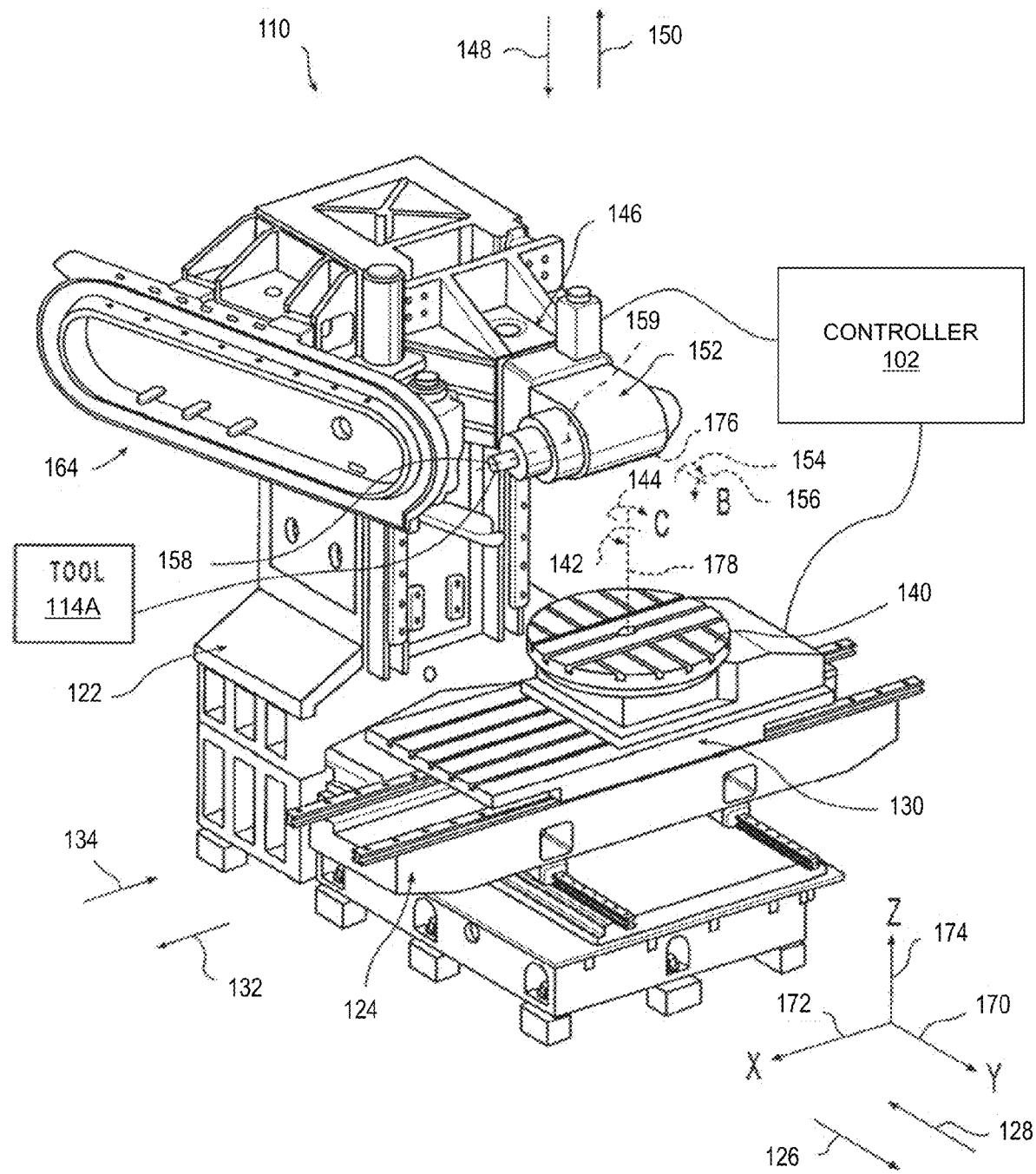
FIG. 7 illustrates an exemplary machine tool apparatus.

Referring to FIG. 7, an exemplary machine apparatus 110 is shown. Machine tool apparatus 110 includes a frame 122 having a first saddle 124 coupled thereto. Saddle 124 is translatable in directions 126 and 128. A second saddle 130 is supported by first saddle 124. Saddle 130 is translatable in directions 132 and 134 relative to saddle 124. A platform 140 is supported by saddle 130 and is rotatable relative to saddle 130 in directions 142 and 144. In one embodiment, each of saddle 124, saddle 130, and platform 140 are moveable through motors which are controlled by controller 102.

Further, a third saddle 146 is supported by frame 122. Saddle 146 is translatable in directions 148 and 150. Saddle 146 supports a rotatable member 152. Rotatable member 152 is rotatable in directions 154 and 156 relative to saddle 146. In one embodiment, each of saddle 146 and rotatable member 152 are moveable through motors which are controlled by controller 102.

A tool spindle 158 is supported by platform 152. Various tools 114 may be coupled to tool spindle 158 to perform various operations with machine tool apparatus 110. Exemplary tools include and an end mill, a drill, a tap, a reamer, and other suitable tools. Tool spindle 158 is rotatable about a tool spindle axis 159 to input a rotation to the tool 161. In one embodiment, a plurality of tools 114 are stored in a tool carousal 164. Additional details about an exemplary tool carousal 164 are provided in U.S. patent application Ser. No. 11/890,384, the disclosure of which is expressly incorporated by reference herein.

The movement of saddle 124 in direction 126 or direction 128 is illustrated as a movement in an y-axis 170. The movement of saddle 130 in direction 132 or direction 134 is illustrated as a movement in an x-axis 172. The movement of saddle 146 in direction 148 and direction 150 is illustrated as a movement in an z-axis 174. The rotation of rotatable member 152 in direction 154 or direction 156 is illustrated as a movement in an B-axis 176. The rotation of platform 140 in direction 142 or direction 144 is illustrated as a movement in an C-axis 178. Machine tool apparatus 110 is an exemplary 5-axis machine. In one embodiment, one of B-axis 176 and C-axis 178 is replaced with an A-axis wherein platform 140 is tiltable about one of x-axis 172 and y-axis 170.

Through the movement of one or more of the 5-axes of machine tool apparatus 110 a tool 114A may be positioned relative to a part 112 supported by platform 140 to be machined. Part 112 may be secured to platform 140 to maintain the position of part 112 to platform 140.

The movement of one or more of the 5-axes of machine tool apparatus 110 is controlled through controller 112. Returning to FIG. 6, controller 102 executes machine tool control software 116 which is stored on a memory 118. Memory 118 is a computer readable medium and may be a single storage device or may include multiple storage devices, located either locally with controller 102 or accessible across a network. Computer-readable media may be any available media that may be accessed by controller 102 and includes both volatile and non-volatile media. Further, computer readable-media may be one or both of removable and non-removable media. By way of example, computer-readable media may include, but is not limited to, RAM, ROM, EEPROM, flash memory or other memory technology, CD-ROM, Digital Versatile Disk (DVD) or other optical disk storage, magnetic cassettes, magnetic tape, magnetic disk storage or other magnetic storage devices, or any other medium which may be used to store the desired information and which may be accessed by controller 102. In one embodiment, controller 102 may be a single computing device. In one embodiment, controller may include multiple computing devices.

Figure 9:
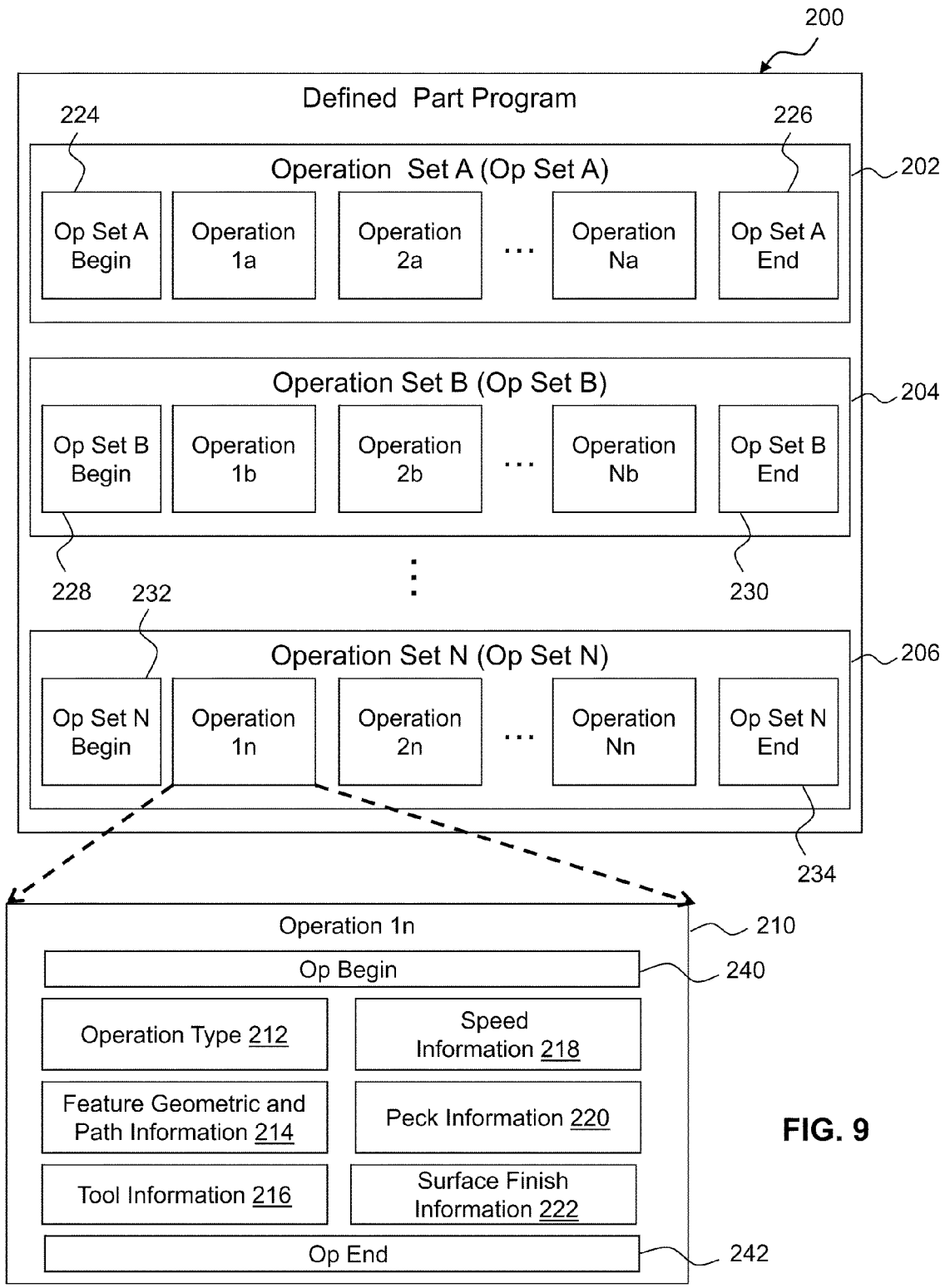
FIG. 9 illustrates a defined part program including a plurality of operation sets, each operation set including one or more operations.

The movement of one or more of the 5-axes of machine tool apparatus is based on the tool path and tool information specified in a defined part program 200. Referring to FIG. 9, defined part program 200 includes a plurality of operation sets, illustratively Operation Set A 202, Operation Set B 204, and Operation Set N 206 are shown. Although three operation sets are shown, it is understood that defined part program 200 may include any number of operation sets.

Each of the operation sets include a plurality of operations which are interpreted by machine tool control software 116 to control the movement of one or more of the 5-axes of machine tool apparatus 110. An exemplary operation 210 is represented in FIG. 9. Operation 210 includes an operation identifier 212, tool path information 214, and tool information 216. The operation identifier 212 provides an operation type for defined part program 200. In one embodiment, the operation types refer to the stage of machining of the operation. Exemplary stages of machining include Roughing; Semi-Finishing; and Finishing. Other exemplary stages of machining may be identified. The tool information 216 specifies the tool to be used during the execution of operation 210. Tool information 216 may include a name of the tool, a position of the tool in a tool carousal, or other information that identifies the tool such that machine tool control software 116 is able to interpret which tool to select. The feature geometric and path information 214 specifies the tool path for the tool to follow during execution of operation 210 to produce the desired feature.

Operation 210 may further include additional information. Exemplary additional information includes tool speed information 218, peck information 220, and surface finish information 222. The tool speed information 218 specifies spindle rotational speed. Peck information 28 specifies maximum depth to cut for a specified tool. Surface finish information provides a surface quality measure for the desired feature. In one embodiment, the surface finish information is an SFQ value as disclosed in U.S. patent application Ser. No. 11/830,429, titled SYSTEM AND METHOD FOR SURFACE FINISH MANAGEMENT, the disclosure of which is expressly incorporated by reference herein.

In addition to geometry operations, an operation may simply provide operational information to the controller. For example, a change part setup block may provide a new geometrical reference system for subsequent operations. In another example, an operation may specify a zone for a multi-zone machine tool system. An exemplary multi-zone machine tool system is provided in U.S. Provisional Patent Application Ser. No. 61/172,066, titled MULTI-ZONE MACHINE TOOL SYSTEM, the disclosure of which is expressly incorporated by reference herein. Another example is a part probing operation.

Each operation set includes one or more operations 210 which are grouped together. Operations 210 may be grouped together to form an operation set based on the feature on the part 112 to which they correspond. As one example, a roughing operation for a first feature and a finishing operation for the first feature may be grouped together to form an operation set. As another example, a plurality of operations may be grouped together to form an operation set based on a required execution order of the plurality of operations. For example, a first operation which defines a pocket will need to be executed prior to a second operation which defines a hole at the base of the pocket. As yet another example, a threaded hole may be an operational set which includes a center drill operation to locate a center of the hole, a drill operation to size the hole, and a tap operation to provide threads on the side of the hole.

Each operation set includes an Op Set Begin identifier and an Op Set End identifier. Operation set 202 has an Op Set A Begin identifier 224 and an Op Set A End identifier 226. Operation set 204 has an Op Set B Begin identifier 228 and an Op Set B End identifier 230. Operation set 206 has an Op Set N Begin identifier 232 and an Op Set N End identifier 234. These identifiers identify the beginning point of the respective operation set and the ending point of the respective operation set. All operations positioned between the respective Op Set Begin identifier and the respective Op Set End identifier are considered part of the operational set. Exemplary Op Set Begin identifiers and Op Set End identifiers may be any portion of defined part program 200 that conveys to machine tool control software 116 that it is an identifier of an operation set beginning and an operation set ending, respectively. Exemplary identifiers include one or more specified G codes for an NC program.

In a similar manner, each operation 210 includes an Op Begin identifier 240 and an Op End identifier 242. These identifiers identify the beginning point of the respective operation and the ending point of the respective operation. All information provided between the Op Begin identifier 240 and the Op End identifier 242 is considered part of the operational set. Exemplary Op Begin identifiers 240 and Op End identifiers 242 may be any portion of defined part program 200 that conveys to machine tool control software 116 that it is an identifier of an operation beginning and an operation ending, respectively. Exemplary identifiers include one or more specified G codes for an NC program.

Figure 9A:
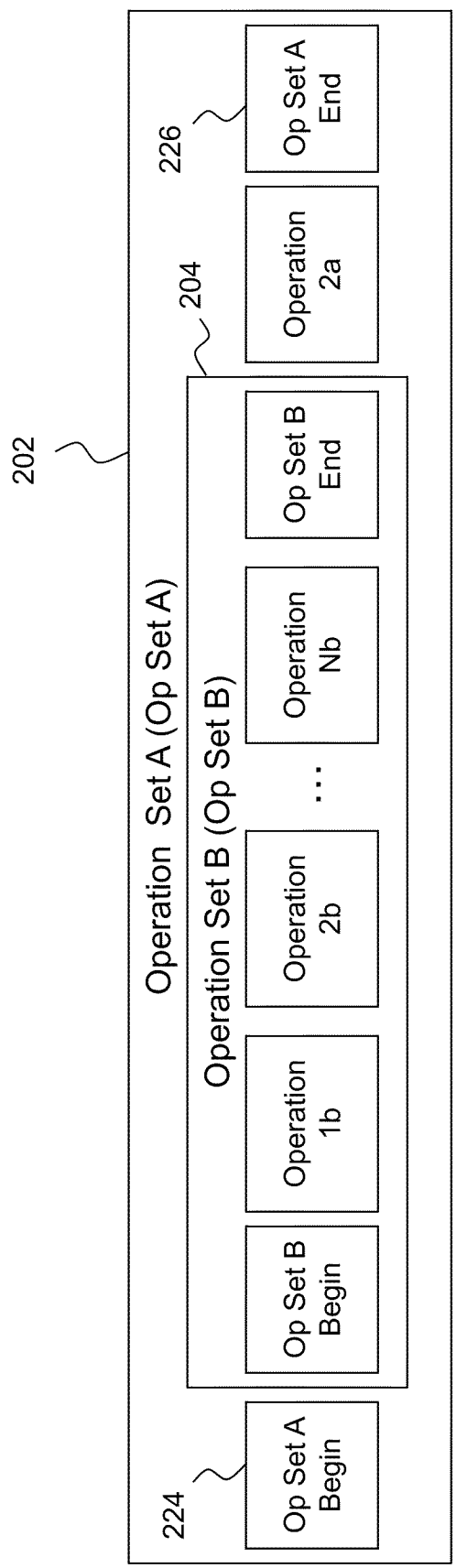
FIG. 9A illustrates a portion of a defined part program having nested operation sets.

As shown in FIG. 9, each of operation set 202, operation set 204, and operation set 206 are shown being mutually exclusive. In one embodiment, an operation set may be a subset of another operation set. Referring to FIG. 9A, operation set 204 is a subset of operation set 202. In this case, operation set 204, although being an operation set including multiple operations, is also treated like an operation for operation set 202.

Figure 10A:
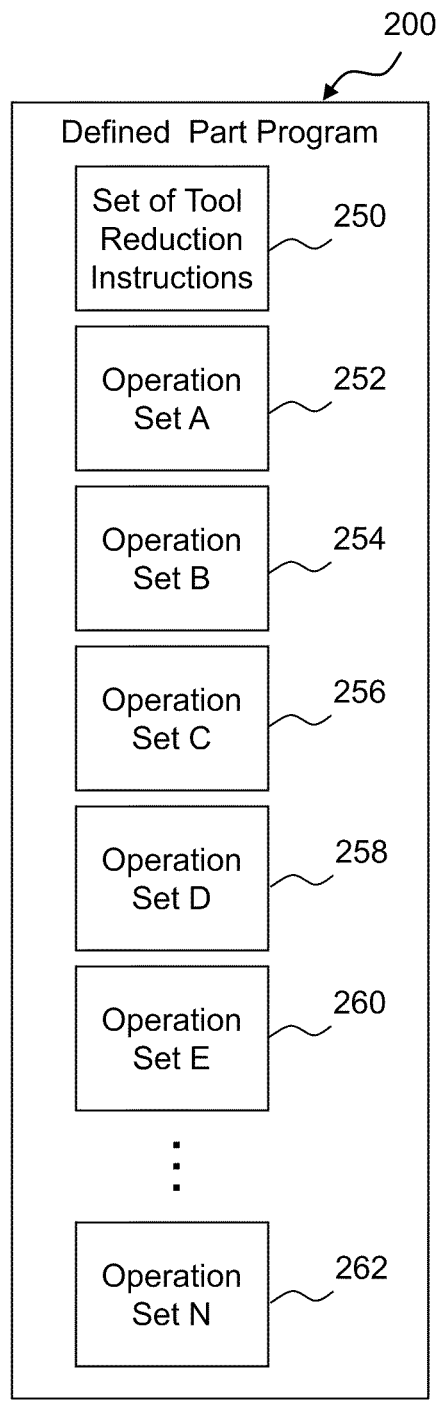
FIG. 10A illustrates a defined part program including a set of tool change reduction instructions provided at a beginning of the defined part program.

Referring to FIG. 10A, a first defined program 200 is represented. Defined part program 200 in FIG. 10A includes a set of tool change reduction instructions 250 followed by a plurality of operation sets 252-262. Set of tool change reduction instructions 250 provides one or more instructions regarding what type of reordering of the operations of defined part program 200 is permissible. Since set of tool change reduction instructions 250 is the only set of tool change reduction instructions in defined part program 200 all of the operation sets 252-262 of defined part program 200 are governed by set of tool change reduction instructions 250.

Figure 10B:
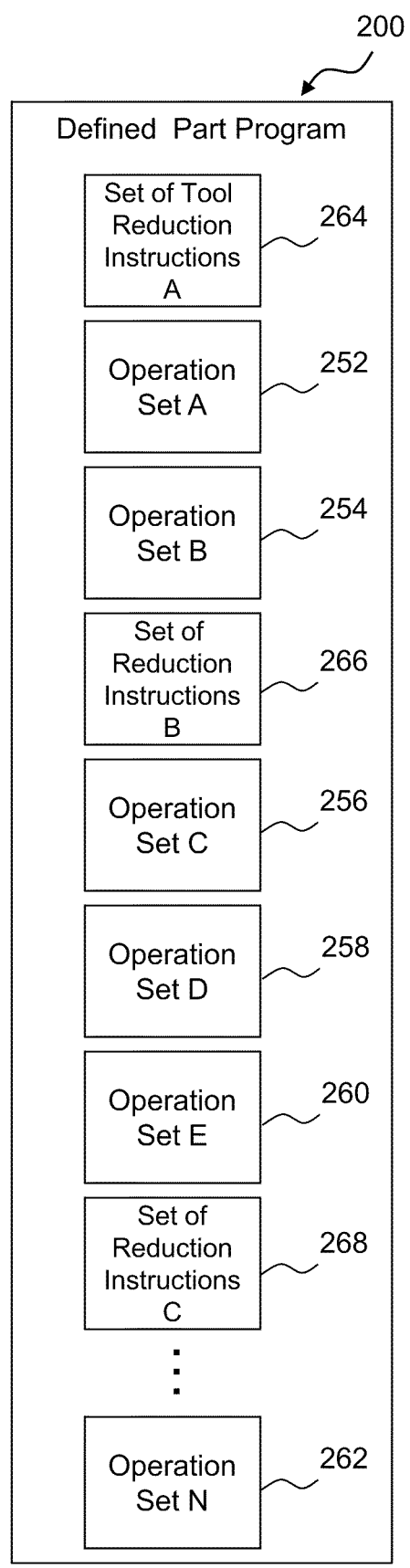
FIG. 10B illustrates a defined part program including a plurality of sets of tool change reduction instructed provided at various portions of the defined part program.

Often times, specifying a single set of tool change reduction instructions 250 for defined part program 200 does not result in the most efficient reduction in the number of tool changes required to execute defined part program 200. This is because while it is likely that a portion of the operations of the operation sets 252-262 must be performed in a given order, the remainder of the operations of the operation sets 252-262 may be performed in a less restrictive order. Referring to FIG. 10B, a second defined program 200 is represented. The defined part program 200 in FIG. 10B includes a first set of tool change reduction instructions 264, a second set of tool change reduction instructions 266, and a third set of tool change reduction instructions 268. The first set of tool change reduction instructions 264 provides one or more instructions regarding what type of reordering of the operations of operation set 252 and operation set 254 is permissible. Second set of tool change reduction instructions 266 provides one or more instructions regarding what type of reordering of the operations of operation set 256, operation set 258, and operation set 260 is permissible. Third set of tool change reduction instructions 268 provides one or more instructions regarding what type of reordering of the operations of the remaining operation sets up to operation set 262 is permissible. By having multiple sets of tool change reduction instructions, the number of tool changes may be further reduced.

Figure 8:
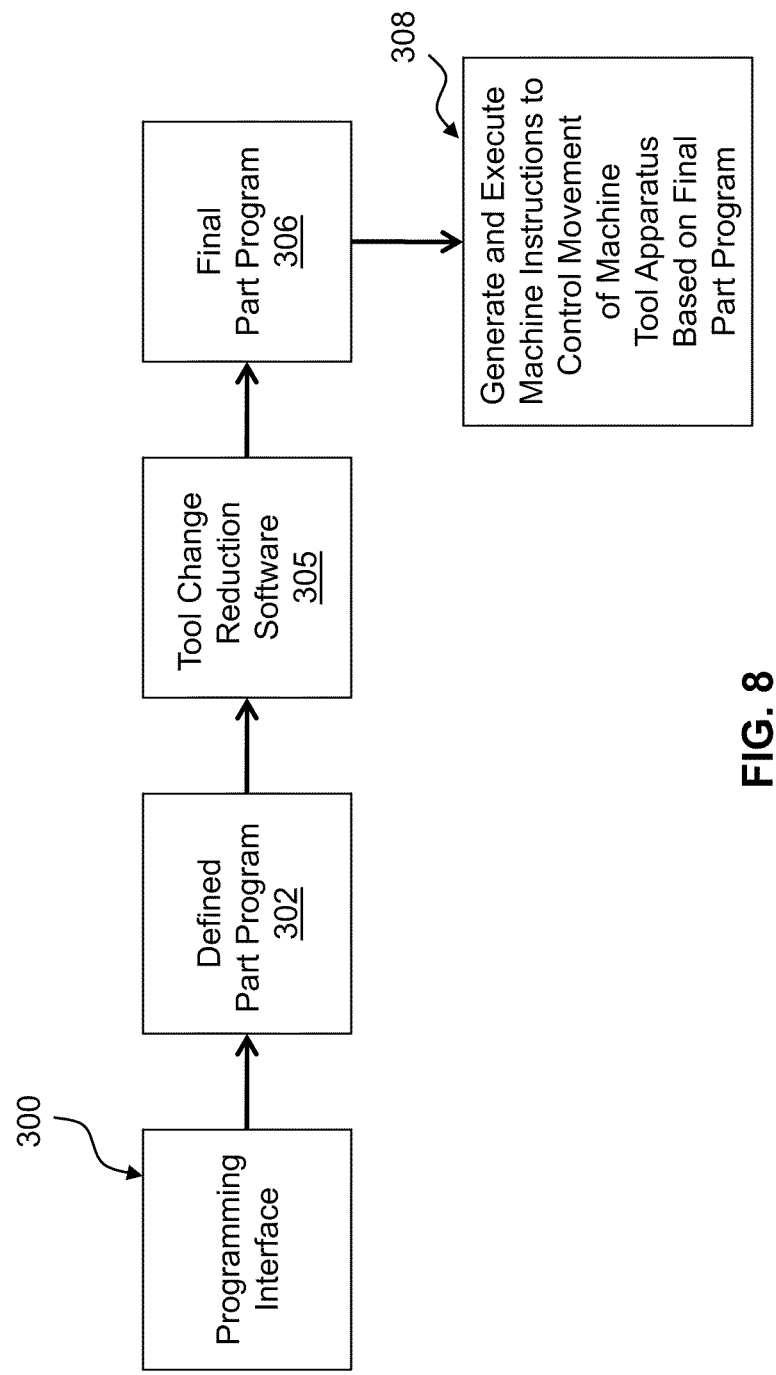
FIG. 8 illustrates a flow process for controlling a machine tool system.

Referring to FIG. 8, an operator though a programming interface 300 creates a defined part program 302. The defined part program 302 includes operation sets and at least one set of tool change reduction instructions. The defined part program 302 is processed by tool change reduction software 305 of machine tool control software 116 to produce a final part program 306. Final part program 306 is then used by machine tool control software 116 to control the movement of machine tool apparatus 110, as represented by block 308. The use of final part program 306 instead of defined part program 302 results in fewer tool change operations to be performed during processing of part 112, thereby saving time. The final part program does not alter the tool used for any operation of the plurality of operations, but rather only has a reordered execution order of the plurality of operations to reduce the number of tool changes.

Figure 11:
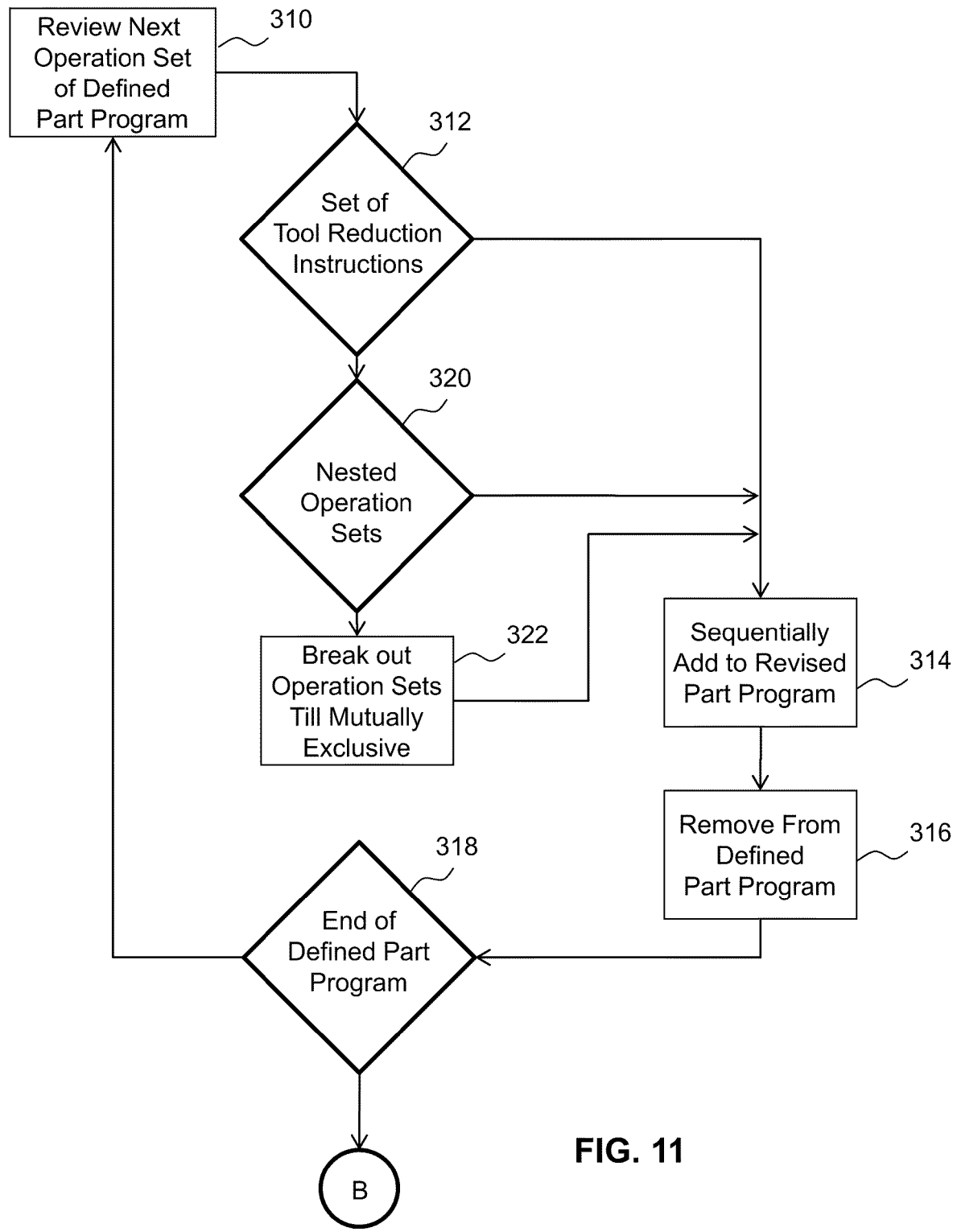
FIGS. 11 and 12 illustrate a process of tool change reduction software which alters an execution order of one or more operations of a defined part program based on the instructions provided in one or more sets of tool change reduction instructions.
Figure 12:
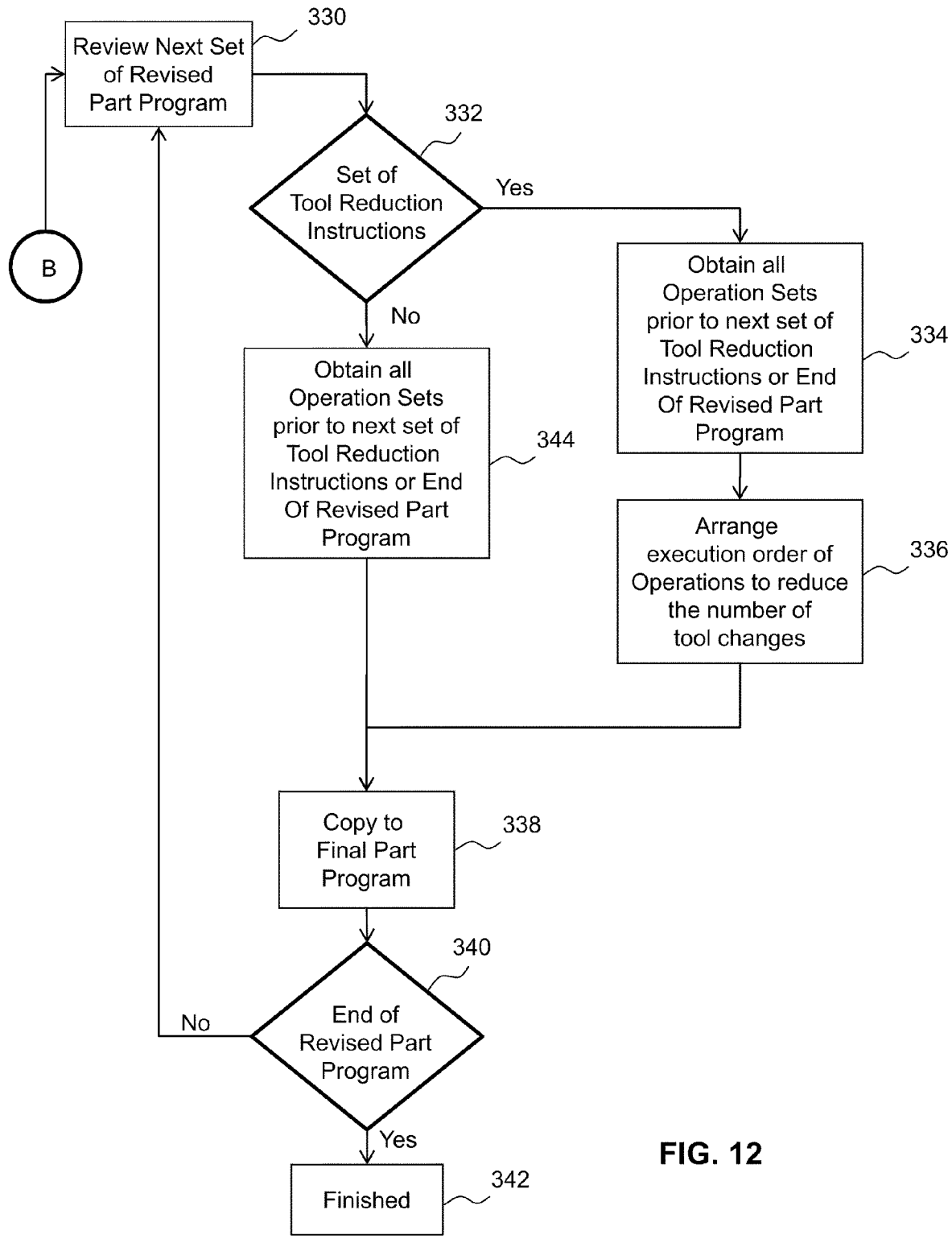

Referring to FIGS. 11 and 12, an exemplary operation of tool change reduction software 305 is shown. Tool change reduction software 305 reviews the next operation set of a defined part program 302, as represented by block 310. Tool change reduction software 305 determines if the set is an operation set or a set of tool change reduction instructions, as represented by block 312. If the set is a set of tool change reduction instructions, it is added as a set of a revised part program, as represented by block 314. If this is the first set reviewed, then the revised part program is created and the set becomes the first set of the new revised part program. The set is removed from or otherwise inactivated in the defined part program, as represented by block 316. A check is made to see if additional sets are provided in the defined part program, as represented by block 318.

If additional sets are provided in the defined part program, then the next set is reviewed as represented by block 310. If the next set is an operation set, a check is made to see if it contains nested operation sets, as represented by block 320. If not, the operation set is added to the end of the revised part program, as represented by block 314. If the operation set includes other operation sets nested therein, these operation sets are broken out to provide mutually exclusive operation sets, as represented by block 322. The mutually exclusive operation sets are then added to the revised part program, as represented by block 314. For example, in FIG. 9A operation set 204 will be removed from operation set 202 and operation set 202 will contain only operation 2a. Then operation set 204 is added to the revised part program followed by the modified operation set 202. If operation set 202 had included an operation prior to operation set 204 as well, then three operation sets would be added to the revised part program: a first one including the operations of operation set 202 prior to operation set 204; a second one including the operations of operation set 204; and a third one including the operations of operation set 202 following operation set 204.

Once the end of defined part program 200 is reached, the first set of the revised part program is reviewed as represented by block 330 in FIG. 12. The revised part program is processed to generate the final part program 306 which includes an arrangement of the operations of the revised part program to reduce the number of tool changes required to execute the program. The arrangement will include a reordering of the execution sequence of operations. The execution sequence of the operations within a given operation set is to be maintained, although operations from another operation set may be interwoven therewith. For example, if a first operation set includes operations 1a, 1b, and 1c and a second operation set includes operations 2a, 2b, and 2c, the execution order of the operations may be reordered in a multitude of ways that still preserves the intra-operation set order. The execution order is based on the instructions in the controlling set of tool change reduction instructions. An exemplary reordering is 1a, 2a, 1b, 1c, 2b, 2c. An exemplary prohibited ordering would be 1a, 2c, 1b, 1c, 2a, 2b. This is prohibited because 2c proceeds 2a and 2b.

Returning to FIG. 12, tool change reduction software 305 determines if the next set is a set of tool change reduction instructions or an operation set, as represented by block 332. If the next set is a set of tool change reduction instructions, then tool change reduction software 305 gathers all of subsequent operation sets until a new set of tool change reduction instructions or the end of the revised program is encountered, as represented by block 334. Tool change reduction software 305 then arranges the execution order of the operations of the gathered operation sets to reduce the number of tool changes needed to perform the gathered operation sets, as represented by block 336. Each operation retains its original tool and path information. The arrangement is based on the information provided in the set of tool change reduction instructions. Examples of instructions and their effect on the arrangement of the execution order of operations are provided in FIGS. 13-15, discussed below. The order of execution is then copied to the final part program 306, as represented by block 338. A check is made to see if the end of the revised part program has been reached, as represented by block 340. If so, tool change reduction software 305 exits. Otherwise, the next set is reviewed, as represented by block 330.

Returning to block 332, if the next set is not a set of tool change reduction instructions, then tool change reduction software 305 gathers all of subsequent operation sets until a set of tool change reduction instructions or the end of the revised program is encountered, as represented by block 344. The gathered operation sets are then copied to the final part program 306, as represented by block 338. A check is made to see if the end of the revised part program has been reached, as represented by block 340. If so, tool change reduction software 305 exits. Otherwise, the next set is reviewed, as represented by block 330.

EXAMPLE 1

Figure 13:
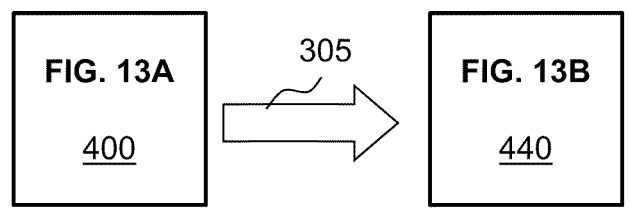
FIGS. 13, 13A, 13B illustrate a comparison of a defined part program and a final part program generated by the tool change reduction software.
Figure 13A:
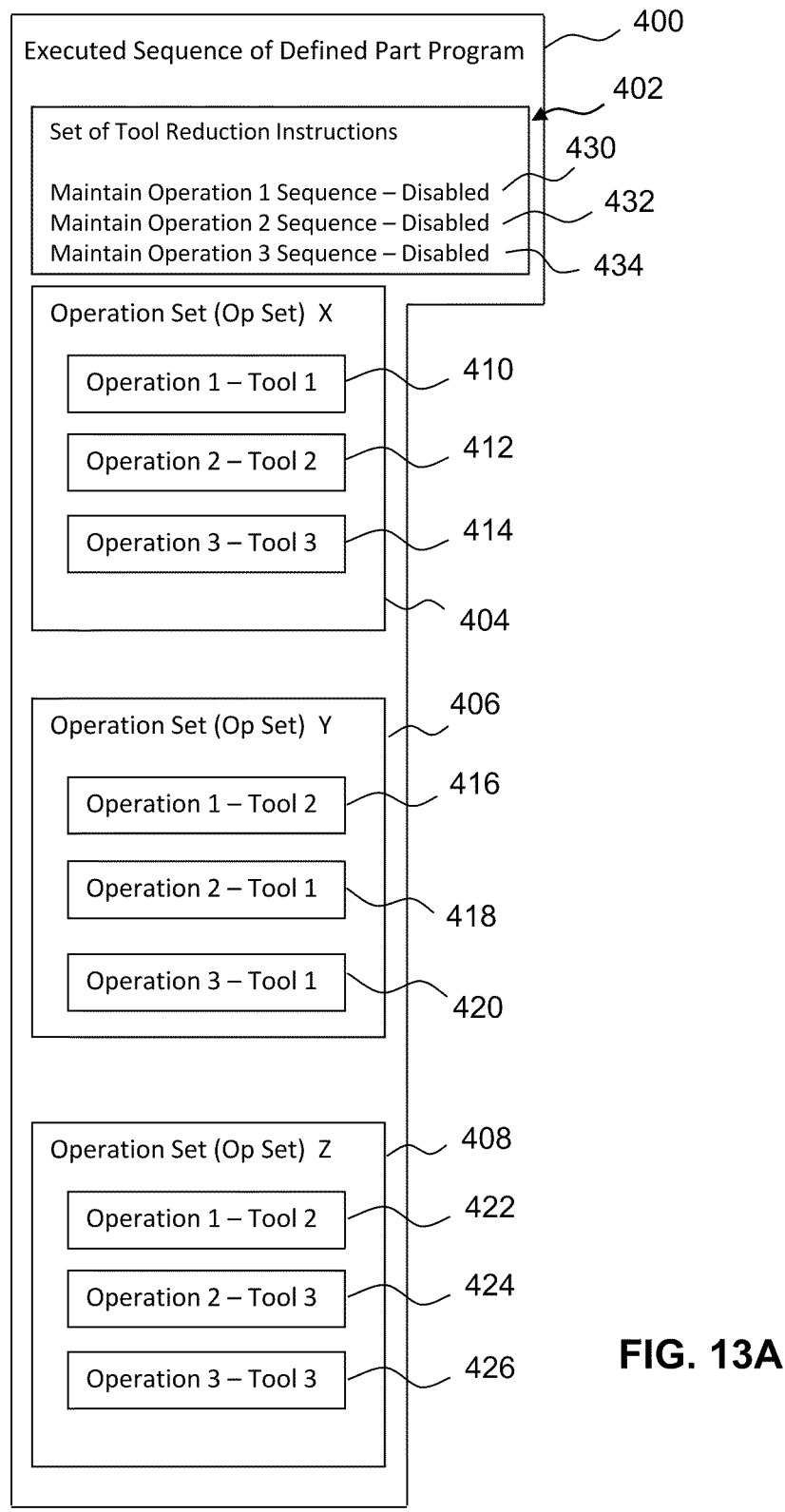

Referring to FIG. 13A, an exemplary defined part program 400 is represented. Defined part program 400 includes a set of tool change reduction instructions 402, a first operation set 404, a second operation set 406, and a third operation set 408. For purposes of explaining the operation of tool change reduction software 305, three operation types "1", "2", and "3" are provided. In one embodiment, these three operation types correspond to a Roughing type operation, a Semi-finish type operation, and a Finish type operation. Each of the operation sets 404-408 includes one operation of each type. However, a given operation set may not include any operation of a given operation type and/or may include multiple operations of a given operation type. Also, the tool used for each operation is identified. For first operation set 404, three operations 410, 412, and 414 are shown. For second operation set 406, three operations 416, 418, and 420 are shown. For third operation set 408, three operations 422, 424, and 426 are shown.

Turning to set of tool change reduction instructions 402, three instructions 430, 432, and 434 are provided. Absent any instructions, tool change reduction software 305 will arrange the defined part program 400 to follow the order as presented in defined part program 400 which maintains both the Intra-set order of the operations for each operation set and completes a first operation set prior to beginning a second operation set. The inclusion of tool change instructions may result in at least a second operation set being started prior to a first operation set being completed, while still preserving the Intra-set order of operations for each operation set.

For the example given in FIG. 13A the set of tool change reduction instructions 402 includes a Maintain Operation 1 Sequence instruction 430 set to Disabled. This means that it is permissible for the operations of type Operation 1 to be performed in a different execution order than provided in defined part program 400. Also, a Maintain Operation 2 Sequence instruction 432 is set to Disabled. This means that it is permissible to for the operations of type Operation 2 to be performed in a different execution order than provided in defined part program 400. Finally, a Maintain Operation 3 Sequence instruction 434 is set to Disabled. This means that it is permissible to for the operations of type Operation 3 to be performed in a different execution order than provided in defined part program 400.

Figure 13B:
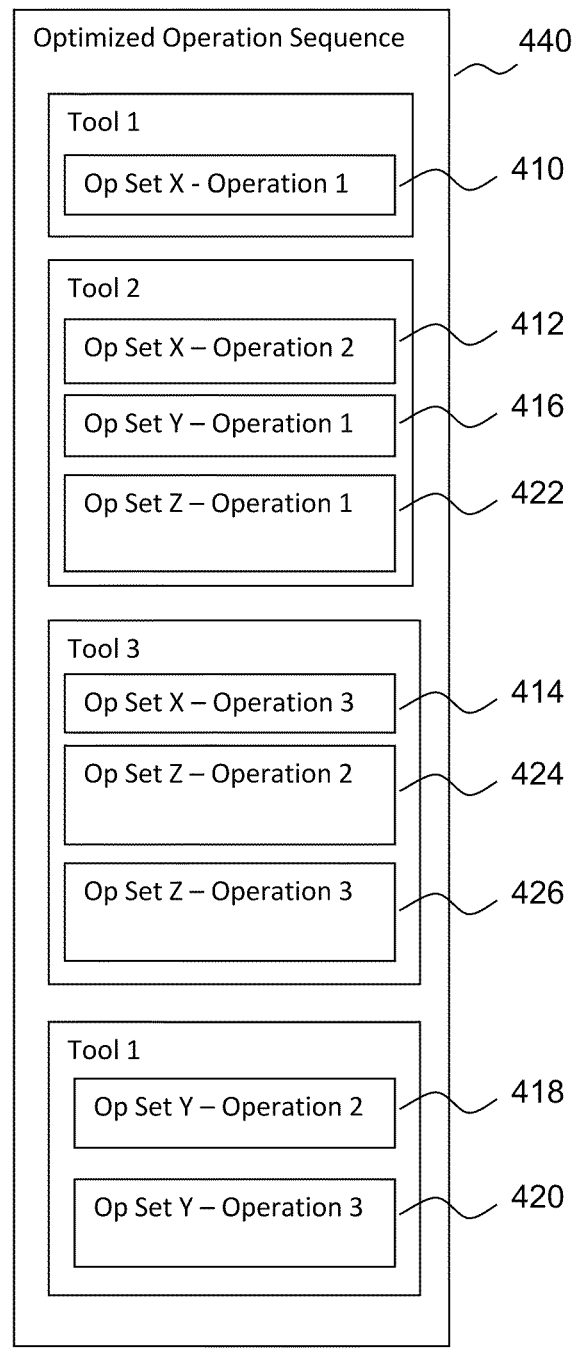

Following the description from FIG. 12, as represented in FIG. 13, tool change reduction software 305 reviews defined part program 400 (see FIG. 13A) to generate final part program 440 (see FIG. 13B). Looking to FIG. 13A, tool change reduction software 305 first encounters set of tool change reduction instructions 402 and notes the instructions 430-434 provided therein. Tool change reduction software 305 then obtains first operation set 404, second operation set 406, and third operation set 408 because these are all of the subsequent operation sets of defined part program 400 (no other set of tool change reduction instructions are provided). Tool change reduction software 305 then arranges the execution order of the operations of first operation set 404, second operation set 406, and third operation set 408 based on the instructions provided in set of tool change reduction instructions 402. The execution order for the resultant final part program 440 is shown in FIG. 13B.

Tool change reduction software 305 begins with operation 410 of first operation set 404 which is the first operation it encounters. Operation 410 uses Tool 1. Tool change reduction software 305 looks at the next operation to be executed of the first operation set 404 (which is operation 412), the next to be executed operation of second operation set 406 (which is operation 416), and the next to be executed operation of third operation set 408 (which is operation 422) to see if any of them use Tool 1.

TABLE A

| Eligible Operation | Operation Set | Operation Type | Operation Type Instruction | Tool |
| --- | --- | --- | --- | --- |
| 412 | 404 | Operation 2 | Disabled | 2 |
| 416 | 406 | Operation 1 | Disabled | 2 |
| 422 | 408 | Operation 1 | Disabled | 2 |

If so they would be performed next because instruction 430 does not require that all Operation 1 Type operations have their order maintained. The reason that only the next to be executed operation is reviewed for each operation set is that tool change reduction software 305 maintains the operation sequence of operations within a given operation set ("Intra-set"). As such, tool change reduction software 305 will not skip over an unexecuted operation of a given operation set to perform a subsequent operation in that same operation set.

None of the next to be executed operations of first operation set 404, second operation set 406, and third operation set 408 use Tool 1, so tool change reduction software 305 moves to the next operation to be executed, which is operation 412. If instruction 430 was set to Enabled then operation 416 would be next because all operations of type Operation 1 must be performed prior to type Operation 2 operations or type Operation 3 operations, as long as such execution will not cause a skip in the operation sequence within a given operation set. Operation 412 requires Tool 2. It is added to final part program 440.

Tool change reduction software 305 looks at the next to be executed operation of first operation set 404 (which is operation 414), the next to be executed operation of second operation set 406 (which is operation 416), and the next to be executed operation of third operation set 408 (which is operation 422) to see if any of them use Tool 2.

TABLE B

| Eligible Operation | Operation Set | Operation Type | Operation Type Instruction | Tool |
| --- | --- | --- | --- | --- |
| 414 | 404 | Operation 3 | Disabled | 3 |
| 416 | 406 | Operation 1 | Disabled | 2 |
| 422 | 408 | Operation 1 | Disabled | 2 |

The first one that uses Tool 2 is operation 416 of second operation set 406. Operation 416 is added to final part program 440.

Tool change reduction software 305 again looks at the next to be executed operation of first operation set 404 (which is operation 414), the next to be executed operation of second operation set 406 (which is operation 418), and the next to be executed operation of third operation set 408 (which is operation 422) to see if any of them use Tool 2.

TABLE C

| Eligible Operation | Operation Set | Operation Type | Operation Type Instruction | Tool |
| --- | --- | --- | --- | --- |
| 414 | 404 | Operation 3 | Disabled | 3 |
| 418 | 406 | Operation 2 | Disabled | 1 |
| 422 | 408 | Operation 1 | Disabled | 2 |

The first one that uses Tool 2 is operation 422 of third operation set 408. Operation 422 is added to final part program 440.

Tool change reduction software 305 again looks at the next to be executed operation of first operation set 404 (which is operation 414), the next to be executed operation of second operation set 406 (which is operation 418), and the next to be executed operation of third operation set 408 (which is operation 424) to see if any of them use Tool 2.

TABLE D

| Eligible Operation | Operation Set | Operation Type | Operation Type Instruction | Tool |
| --- | --- | --- | --- | --- |
| 414 | 404 | Operation 3 | Disabled | 3 |
| 418 | 406 | Operation 2 | Disabled | 1 |
| 424 | 408 | Operation 2 | Disabled | 3 |

None of the next to be executed operations of first operation set 404, second operation set 406, and third operation set 408 use Tool 2, so tool change reduction software 305 returns to first operation set 404 to see if additional operations still need to be executed. Tool change reduction software 305 next adds operation 414 to final part program 440. Operation 414 uses Tool 3.

Tool change reduction software 305 then looks at the next to be executed operation of first operation set 404 (which is none), the next to be executed operation of second operation set 406 (which is operation 418), and the next to be executed operation of third operation set 408 (which is operation 424) to see if any of them use Tool 3.

TABLE E

| Eligible Operation | Operation Set | Operation Type | Operation Type Instruction | Tool |
|---|---|---|---|---|
| none | 404 | | | |
| 418 | 406 | Operation 2 | Disabled | 1 |
| 424 | 408 | Operation 2 | Disabled | 3 |

The only one that uses Tool 3 is operation 424 of third operation set 408. Operation 424 is added to final part program 440.

Tool change reduction software 305 again looks at the next to be executed operation of first operation set 404 (which is none), the next to be executed operation of second operation set 406 (which is operation 418), and the next to be executed operation of third operation set 408 (which is operation 426) to see if any of them use Tool 3.

TABLE F

| Eligible Operation | Operation Set | Operation Type | Operation Type Instruction | Tool |
|---|---|---|---|---|
| none | 404 | | | |
| 418 | 406 | Operation 2 | Disabled | 1 |
| 426 | 408 | Operation 3 | Disabled | 3 |

The only one that uses Tool 3 is operation 426 of third operation set 408. Operation 426 is added to final part program 440. Since Maintain Operation Sequence 3 instruction 434 is disabled operation 426 is able to be performed prior to operation 420 of second operation set 406.

Tool change reduction software 305 again looks at the next to be executed operation of second operation set 406 (which is operation 418), and the next to be executed operation of third operation set 408 (none) to see if any of them use Tool 3. The only operation set with unexecuted operations is second operation set 406 and the next to be executed operation does not use Tool 3. Since tool change reduction software 305 maintains the order of execution within a given operation set, the remaining operations of second operation set 406 are added to final part program 440 in order.

EXAMPLE 2

Figure 14:
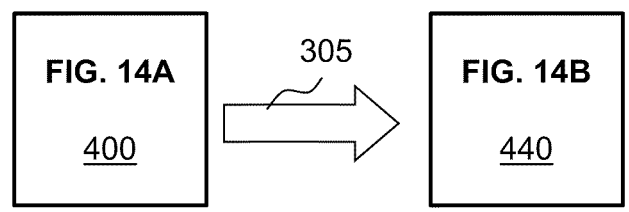
FIGS. 14, 14A, 14B illustrate another comparison of a defined part program and a final part program generated by the tool change reduction software.
Figure 14A:
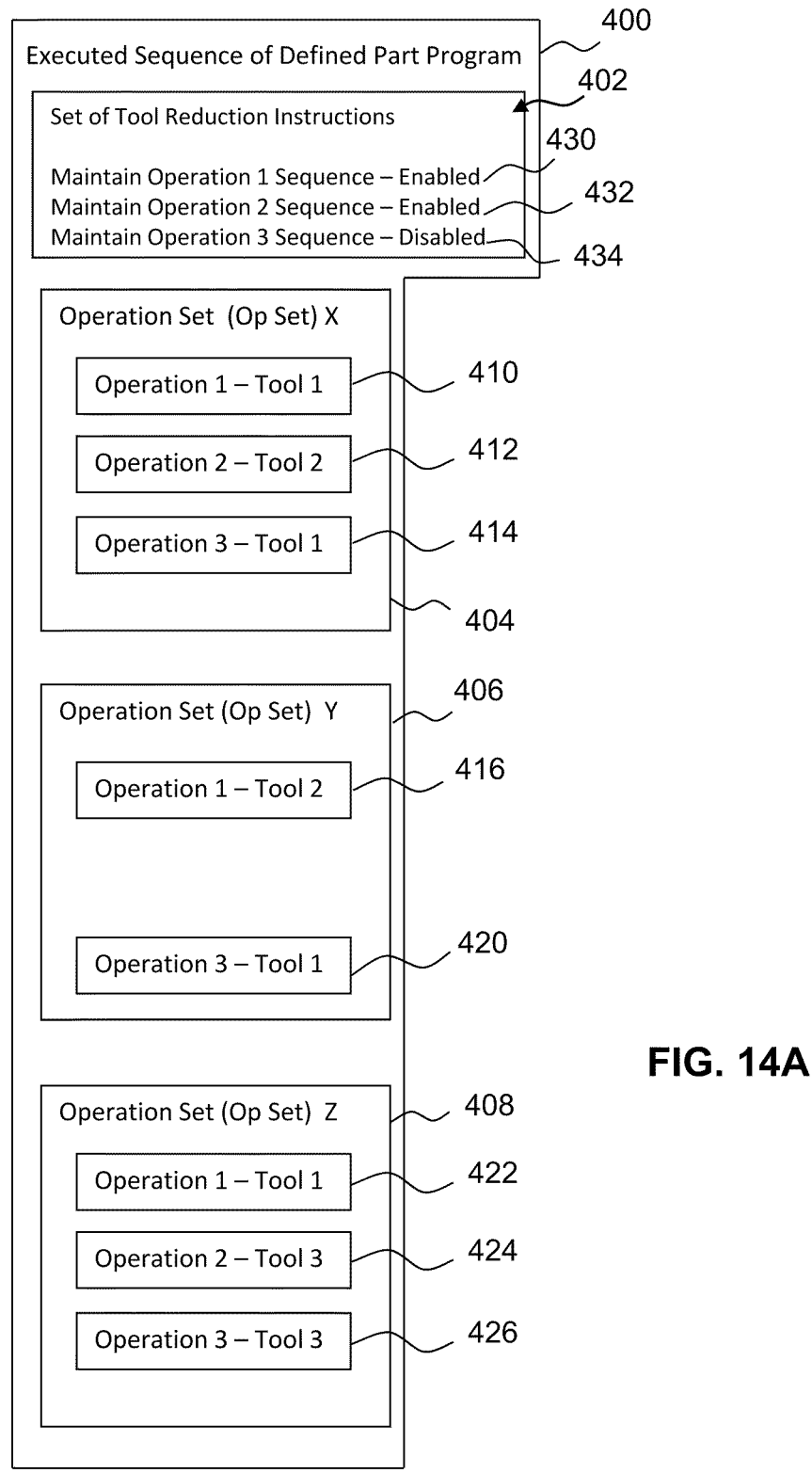

Referring to FIG. 14A, a revised defined part program 400 is represented. Defined part program 400 in FIG. 14A has both the Maintain Operation 1 Sequence instruction 430 and the Maintain Operation Sequence 2 instruction 432 set to Enabled. This means that it is not permissible for the operations of type Operation 1 or of type Operation 2 to be performed in a different execution order than provided in defined part program 400. Further, operation set 406 no longer includes operation 418.

Figure 14B:
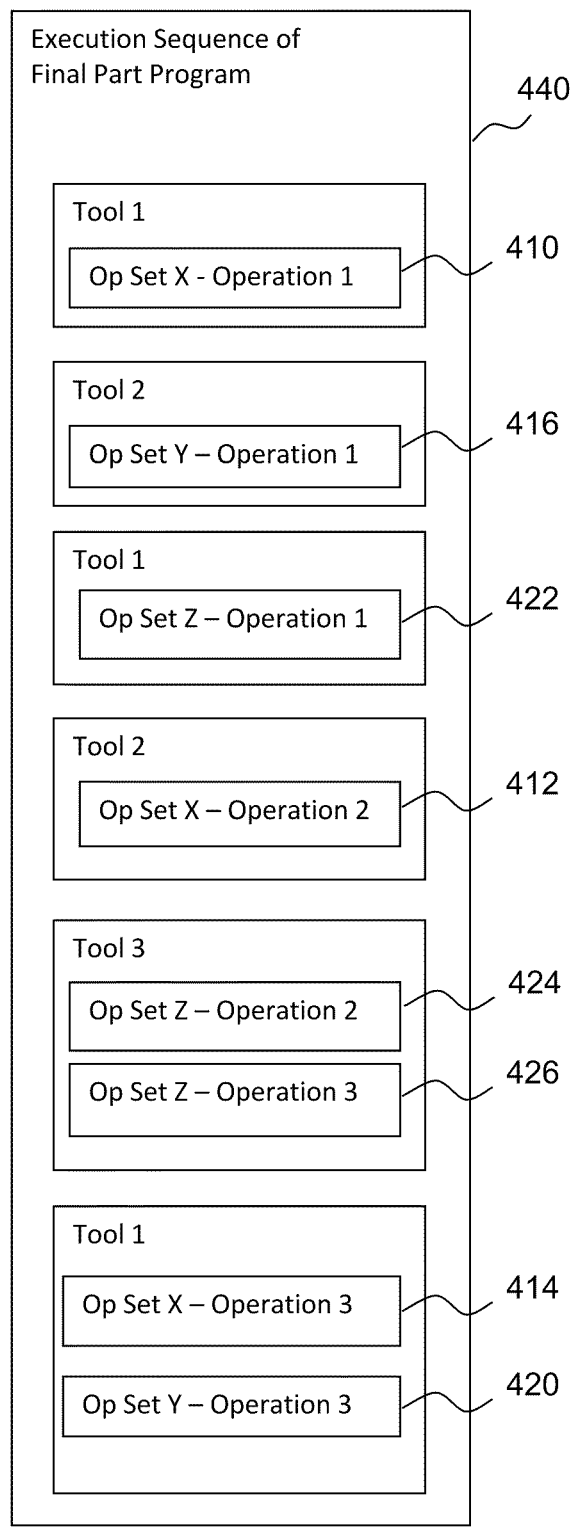

Following the description from FIG. 12, as represented in FIG. 14, tool change reduction software 305 reviews defined part program 400 (see FIG. 14A) to generate final part program 440 (see FIG. 14B). Looking to FIG. 14A, tool change reduction software 305 first encounters set of tool change reduction instructions 402 and notes the instructions 430-434 provided therein. Tool change reduction software 305 then obtains first operation set 404, second operation set 406, and third operation set 408 because these are all of the subsequent operation sets of defined part program 400 (no other set of tool change reduction instructions are provided). Tool change reduction software 305 then arranges the execution order of the operations of first operation set 404, second operation set 406, and third operation set 408 based on the instructions provided in set of tool change reduction instructions 402. The execution order for the resultant final part program 440 is shown in FIG. 14B.

Tool change reduction software 305 begins with operation 410 of first operation set 404 which is the first operation it encounters. Operation 410 uses Tool 1. This is placed in final part program 440. Tool change reduction software 305 then determines the potential or eligible operations to add to final part program 440 next and looks at the next operation to be executed of the first operation set 404 (which is operation 412), the next to be executed operation of second operation set 406 (which is operation 416), and the next to be executed operation of third operation set 408 (which is operation 422) to see if any of them use Tool 1.

TABLE G

| Eligible Operation | Operation Set | Operation Type | Operation Type Instruction | Tool |
|---|---|---|---|---|
| 412 | 404 | Operation 2 | Enabled | 2 |
| 416 | 406 | Operation 1 | Enabled | 2 |
| 422 | 408 | Operation 1 | Enabled | 1 |

The reason that only the next to be executed operation is reviewed for each operation set is that tool change reduction software 305 maintains the operation sequence of operations within a given operation set. As such, tool change reduction software 305 will not skip over an unexecuted operation of a given operation set to perform a subsequent operation in that same operation set.

Even if operation 412 uses Tool 1 it is not added next because instruction 430 is set to Enabled meaning that all Operation 1 type operations must be performed prior to Operation 2 type operations and Operation 3 type operations as long as such execution will not cause a skip in the operation sequence within a given operation set. In one embodiment, operation 412 may be performed next because it is the next operation in Operation set 404 which is the operation set which included the last operation added to final part program 440, even though it is not an Operation 1 type operation. However, even under this embodiment operation 412 will not be added next because it uses Tool 2.

Looking at the remaining options, operation 416 uses Tool 2 and operation 422 uses Tool 1. Both of operations 416 and 422 are Operation 1 type operations and hence are eligible to be added next to final part program 440. Since instruction 430 is set to Enabled, operation 416 is the next operation added to final part program 440 because it is the next Operation 1 type operation. If instruction 430 was set to Disabled, operation 422 would be the next operation added to final part program 440 because it would not require a tool change unlike operation 412 and operation 416. However, since instruction 430 is set to Enabled, operation 416 cannot be skipped.

Tool change reduction software 305 looks at the next to be executed operation of first operation set 404 (which is operation 412), the next to be executed operation of second operation set 406 (which is operation 420), and the next to be executed operation of third operation set 408 (which is operation 422).

TABLE H

| Eligible Operation | Operation Set | Operation Type | Operation Type Instruction | Tool |
|---|---|---|---|---|
| 412 | 404 | Operation 2 | Enabled | 2 |
| 420 | 406 | Operation 3 | Disabled | 1 |
| 422 | 408 | Operation 1 | Enabled | 1 |

Operation 412 uses Tool 2 like the last added operation 416. However, tool change reduction software 305 recognizes that another operation 1 type operation is still eligible which is operation 422. As such, since instruction 430 is set to Enabled, operation 422 is the next operation added to final part program 440 even though it requires a tool change.

Tool change reduction software 305 looks at the next to be executed operation of first operation set 404 (which is operation 412), the next to be executed operation of second operation set 406 (which is operation 420), and the next to be executed operation of third operation set 408 (which is operation 424).

TABLE I

| Eligible Operation | Operation Set | Operation Type | Operation Type Instruction | Tool |
|---|---|---|---|---|
| 412 | 404 | Operation 2 | Enabled | 2 |
| 420 | 406 | Operation 3 | Disabled | 1 |
| 424 | 408 | Operation 2 | Enabled | 3 |

None of the eligible operations are Operation 1 type operations so instruction 430 is irrelevant. Operations 412 and 424 are both Operation 2 type operations and operation 420 is an Operation 3 type operation. As shown in the above table, instruction 432 which corresponds to Operation 2 type operations is Enabled. This means an Operation type 2 operation needs to be added if eligible. Two Operation 2 operations are eligible. The first encountered of these two operations is the next to be added to final part program 440. This is operation 412 which requires a tool change.

Continuing on tool change reduction software 305 looks at the next to be executed operation of first operation set 404 (which is operation 414), the next to be executed operation of second operation set 406 (which is operation 420), and the next to be executed operation of third operation set 408 (which is operation 424).

TABLE J

| Eligible Operation | Operation Set | Operation Type | Operation Type Instruction | Tool |
|---|---|---|---|---|
| 414 | 404 | Operation 3 | Disabled | 1 |
| 420 | 406 | Operation 3 | Disabled | 1 |
| 424 | 408 | Operation 2 | Enabled | 3 |

None of the eligible operations are Operation 1 type operations so instruction 430 is irrelevant. Operation 424 is an Operation 2 type operation and operations 414 and 420 are Operation 3 type operations. As mentioned previously, instruction 432 which corresponds to Operation 2 type operations is Enabled. This means an Operation type 2 operation needs to be added if eligible. Only one Operation 2 operation is eligible. As such, operation 424 is added to final part program 440 even though a tool change is required.

Tool change reduction software 305 again looks at the next to be executed operation of first operation set 404 (which is operation 414), the next to be executed operation of second operation set 406 (which is operation 420), and the next to be executed operation of third operation set 408 (which is operation 426).

TABLE K

| Eligible Operation | Operation Set | Operation Type | Operation Type Instruction | Tool |
|---|---|---|---|---|
| 414 | 404 | Operation 3 | Disabled | 1 |
| 420 | 406 | Operation 3 | Disabled | 1 |
| 426 | 408 | Operation 3 | Disabled | 3 |

None of the eligible operations are Operation 1 type operations so instruction 430 is irrelevant. None of the eligible operations are Operation 2 type operations so instruction 432 is irrelevant. Each of operations 414, 420, and 424 are Operation 3 type operations. Instruction 434 is set to Disabled so all Operation 3 type operations may be performed in any order as long as an operation within a given operation set is not skipped. The last operation added to final part program 440 (operation 424) uses Tool 3. As shown in the above table, operation 426 also uses Tool 3. As such, operation 426 is the next operation added to final part program 440.

Tool change reduction software 305 again looks at the next to be executed operation of first operation set 404 (which is operation 414), the next to be executed operation of second operation set 406 (which is operation 420), and the next to be executed operation of third operation set 408 (which is none).

TABLE L

| Eligible Operation | Operation Set | Operation Type | Operation Type Instruction | Tool |
|---|---|---|---|---|
| 414 | 404 | Operation 3 | Disabled | 1 |
| 420 | 406 | Operation 3 | Disabled | 1 |
| none | 408 | | | |

None of the eligible operations are Operation 1 type operations so instruction 430 is irrelevant. None of the eligible operations are Operation 2 type operations so instruction 432 is irrelevant. Each of operations 414 and 420 are Operation 3 type operations. As mentioned above, instruction 434 is set to Disabled so all Operation 3 type operations may be performed in any order as long as an operation within a given operation set is not skipped. The last operation added to final part program 440 (operation 426) uses Tool 3. Neither of operation 414 or operation 420 uses Tool 3. As such, the next operation in order is added to final part program 440. This is operation 414 which requires a tool change.

Tool change reduction software 305 again looks at the next to be executed operation of first operation set 404 (which is none), the next to be executed operation of second operation set 406 (which is operation 420), and the next to be executed operation of third operation set 408 (which is none).

TABLE M

| Eligible Operation | Operation Set | Operation Type | Operation Type Instruction | Tool |
|---|---|---|---|---|
| none | 404 | | | |
| 420 | 406 | Operation 3 | Disabled | 1 |
| none | 408 | | | |

Since only operation 420 is eligible it is added to final part program 440. Thus, completing final part program 440.

EXAMPLE 3

Figure 15:
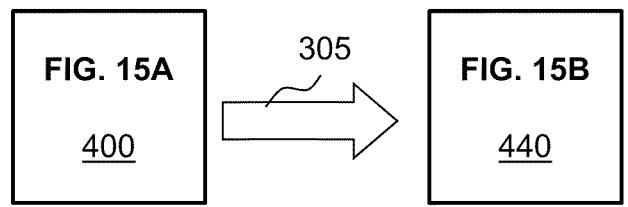
FIGS. 15, 15A, 15B illustrate yet another comparison of a defined part program and a final part program generated by the tool change reduction software.
Figure 15A:
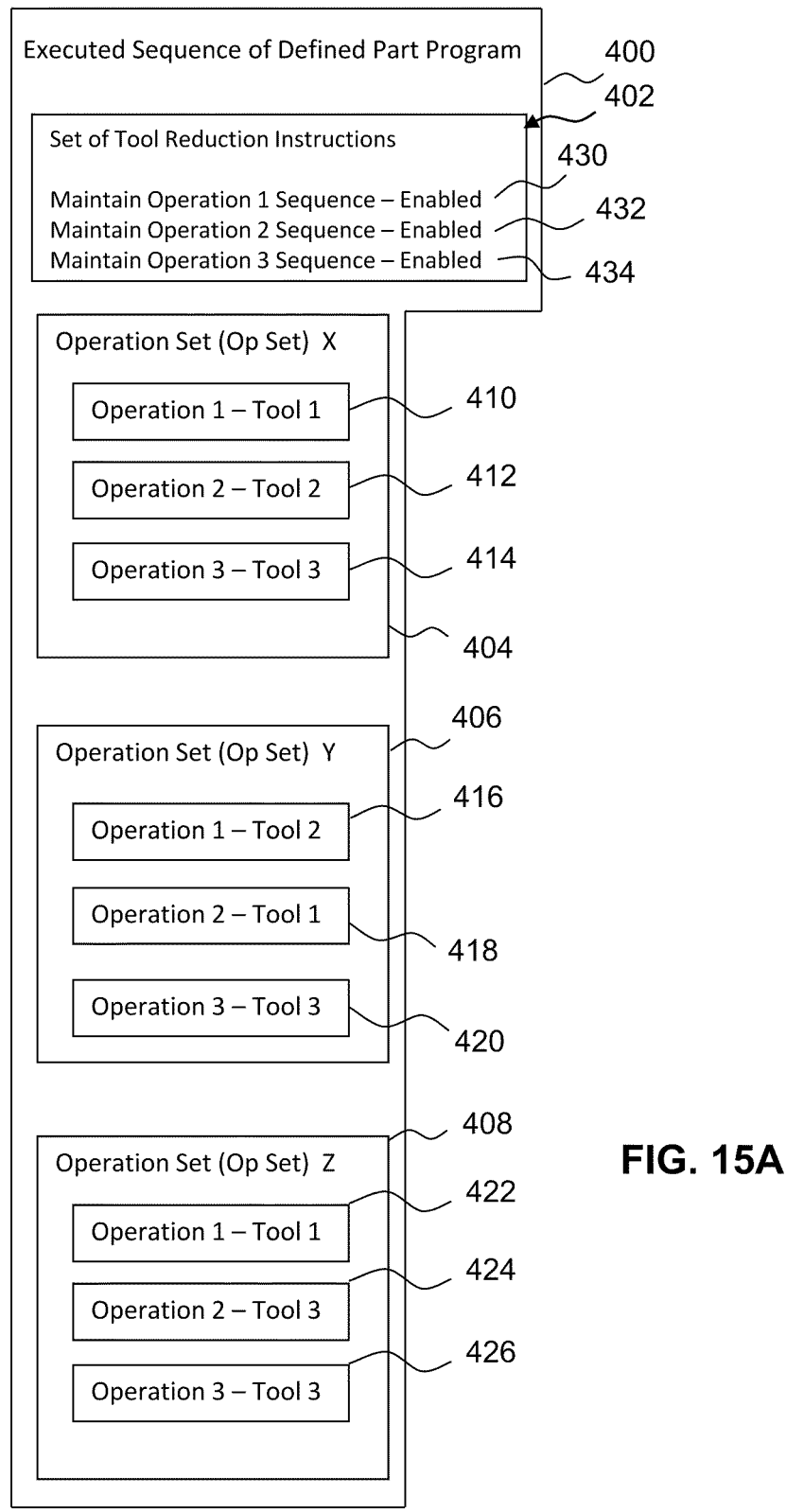

Referring to FIG. 15A, a revised defined part program 400 is represented. Defined part program 400 in FIG. 15A has all of Maintain Operation 1 Sequence instruction 430, Maintain Operation 2 Sequence instruction 432, and Maintain Operation 3 Sequence instruction 434 set to Enabled. This means that it is not permissible for the operations of type Operation 1 or of type Operation 2 or of type Operation 3 to be performed in a different execution order than provided in defined part program 400.

Example 3 includes the same operations as Example 1. Only the settings of the tool change instructions differ. The instructions provided with Example 3 are the most restrictive. The instructions provided with Example 1 are the least restrictive. As explained below, Example 3 requires 5 tool changes. As explained above, Example 1 requires 3 tool changes a reduction of forty percent. Simply executing the operation of defined part program 400 in order results in 7 tool changes. As such, example 1 represents a reduction in the number of tool changes of about 57 percent and example 3 represents a reduction in the number of tool changes of about 28 percent.

Figure 15B:
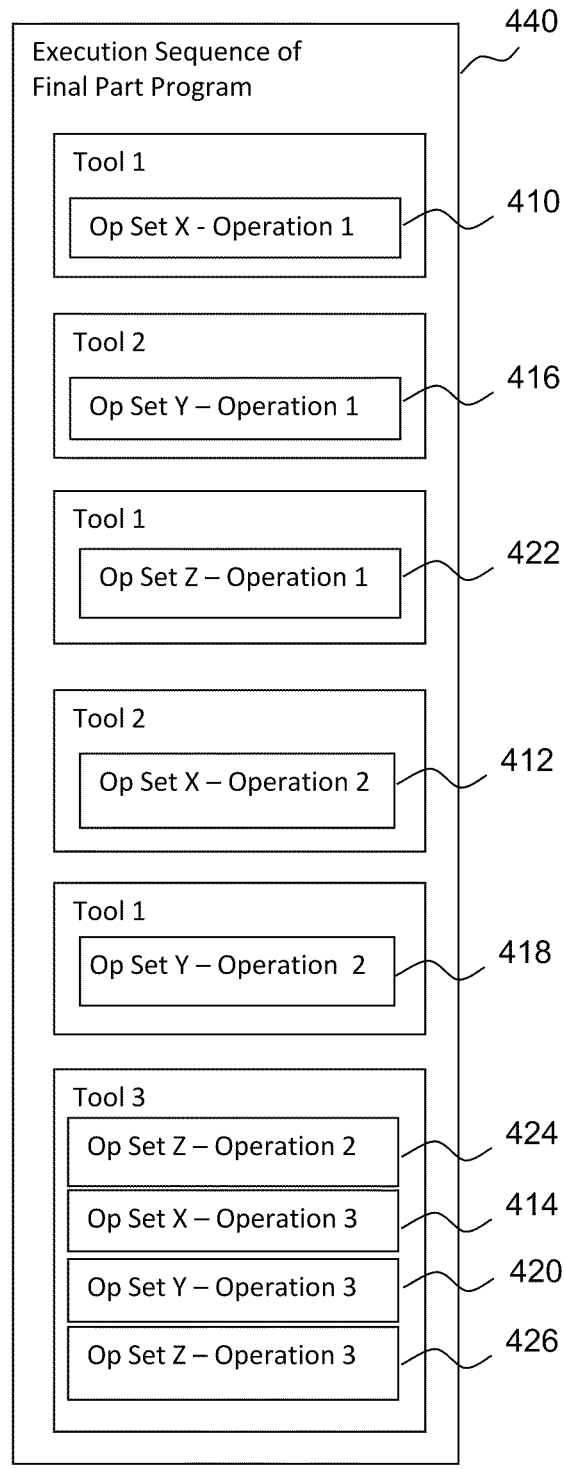

The operation of tool change reduction software 305 in relation to Example 3 is provided below. Following the description from FIG. 12, as represented in FIG. 15, tool change reduction software 305 reviews defined part program 400 (see FIG. 15A) to generate final part program 440 (see FIG. 15B). Looking to FIG. 15A, tool change reduction software 305 first encounters set of tool change reduction instructions 402 and notes the instructions 430-434 provided therein. Tool change reduction software 305 then obtains first operation set 404, second operation set 406, and third operation set 408 because these are all of the subsequent operation sets of defined part program 400 (no other set of tool change reduction instructions are provided). Tool change reduction software 305 then arranges the execution order of the operations of first operation set 404, second operation set 406, and third operation set 408 based on the instructions provided in set of tool change reduction instructions 402. The execution order for the resultant final part program 440 is shown in FIG. 15B.

Tool change reduction software 305 begins with operation 410 of first operation set 404 which is the first operation it encounters. Operation 410 uses Tool 1. This is placed in final part program 440. Tool change reduction software 305 then determines the potential or eligible operations to add to final part program 440 next and looks at the next operation to be executed of the first operation set 404 (which is operation 412), the next to be executed operation of second operation set 406 (which is operation 416), and the next to be executed operation of third operation set 408 (which is operation 422).

TABLE N

| Eligible Operation | Operation Set | Operation Type | Operation Type Instruction | Tool |
|---|---|---|---|---|
| 412 | 404 | Operation 2 | Enabled | 2 |
| 416 | 406 | Operation 1 | Enabled | 2 |
| 422 | 408 | Operation 1 | Enabled | 1 |

The reason that only the next to be executed operation is reviewed for each operation set is that tool change reduction software 305 maintains the operation sequence of operations within a given operation set. As such, tool change reduction software 305 will not skip over an unexecuted operation of a given operation set to perform a subsequent operation in that same operation set.

Since instruction 430 is set to Enabled, all Operation 1 type operations must be added in order and prior to Operation 2 type operations and Operation 3 type operations as long as such execution will not cause a skip in the operation sequence within a given operation set. Further, since instruction 432 is set to Enabled, all Operation 2 type operations must be added in order and prior to Operation 3 type operations as long as such execution will not cause a skip in the operation sequence within a given operation set. Finally, since instruction 434 is set to Enabled, all Operation 3 type operations must be added in order. Given these guidelines, operation 416 is the next operation to be added.

Tool change reduction software 305 then looks at the next to be executed operation of first operation set 404 (which is operation 412), the next to be executed operation of second operation set 406 (which is operation 418), and the next to be executed operation of third operation set 408 (which is operation 422).

TABLE O

| Eligible Operation | Operation Set | Operation Type | Operation Type Instruction | Tool |
|---|---|---|---|---|
| 412 | 404 | Operation 2 | Enabled | 2 |
| 418 | 406 | Operation 2 | Enabled | 1 |
| 422 | 408 | Operation 1 | Enabled | 1 |

Given the above instructions 430-434, operation 422 is the next operation to be added.

Tool change reduction software 305 then looks at the next to be executed operation of first operation set 404 (which is operation 412), the next to be executed operation of second operation set 406 (which is operation 418), and the next to be executed operation of third operation set 408 (which is operation 422).

TABLE P

| Eligible Operation | Operation Set | Operation Type | Operation Type Instruction | Tool |
|---|---|---|---|---|
| 412 | 404 | Operation 2 | Enabled | 2 |
| 418 | 406 | Operation 2 | Enabled | 1 |
| 424 | 408 | Operation2 | Enabled | 3 |

Given the above instructions 430-434, operation 412 is the next operation to be added.

Tool change reduction software 305 then looks at the next to be executed operation of first operation set 404 (which is operation 414), the next to be executed operation of second operation set 406 (which is operation 418), and the next to be executed operation of third operation set 408 (which is operation 422).

TABLE Q

| Eligible Operation | Operation Set | Operation Type | Operation Type Instruction | Tool |
|---|---|---|---|---|
| 414 | 404 | Operation 3 | Enabled | 3 |
| 418 | 406 | Operation 2 | Enabled | 1 |
| 424 | 408 | Operation 2 | Enabled | 3 |

Given the above instructions 430-434, operation 418 is the next operation to be added.

Tool change reduction software 305 then looks at the next to be executed operation of first operation set 404 (which is operation 414), the next to be executed operation of second operation set 406 (which is operation 420), and the next to be executed operation of third operation set 408 (which is operation 422).

TABLE R

| Eligible Operation | Operation Set | Operation Type | Operation Type Instruction | Tool |
|---|---|---|---|---|
| 414 | 404 | Operation 3 | Enabled | 3 |
| 418 | 406 | Operation 3 | Enabled | 3 |
| 424 | 408 | Operation 2 | Enabled | 3 |

Given the above instructions 430-434, operation 424 is the next operation to be added.

Tool change reduction software 305 then looks at the next to be executed operation of first operation set 404 (which is operation 414), the next to be executed operation of second operation set 406 (which is operation 420), and the next to be executed operation of third operation set 408 (which is operation 426).

TABLE S

| Eligible Operation | Operation Set | Operation Type | Operation Type Instruction | Tool |
|---|---|---|---|---|
| 414 | 404 | Operation 3 | Enabled | 3 |
| 418 | 406 | Operation 3 | Enabled | 3 |
| 426 | 408 | Operation 3 | Enabled | 3 |

Given the above instructions 430-434, operation 414 is the next operation to be added.

Tool change reduction software 305 then looks at the next to be executed operation of first operation set 404 (which is none), the next to be executed operation of second operation set 406 (which is operation 420), and the next to be executed operation of third operation set 408 (which is operation 426).

TABLE T

| Eligible Operation | Operation Set | Operation Type | Operation Type Instruction | Tool |
|---|---|---|---|---|
| none | 404 | | | |
| 418 | 406 | Operation 3 | Enabled | 3 |
| 426 | 408 | Operation 3 | Enabled | 3 |

Given the above instructions 430-434, operation 418 is the next operation to be added. This leaves only operation 426 which is added last to final part program 440.

EXAMPLE 4

Figure 16:
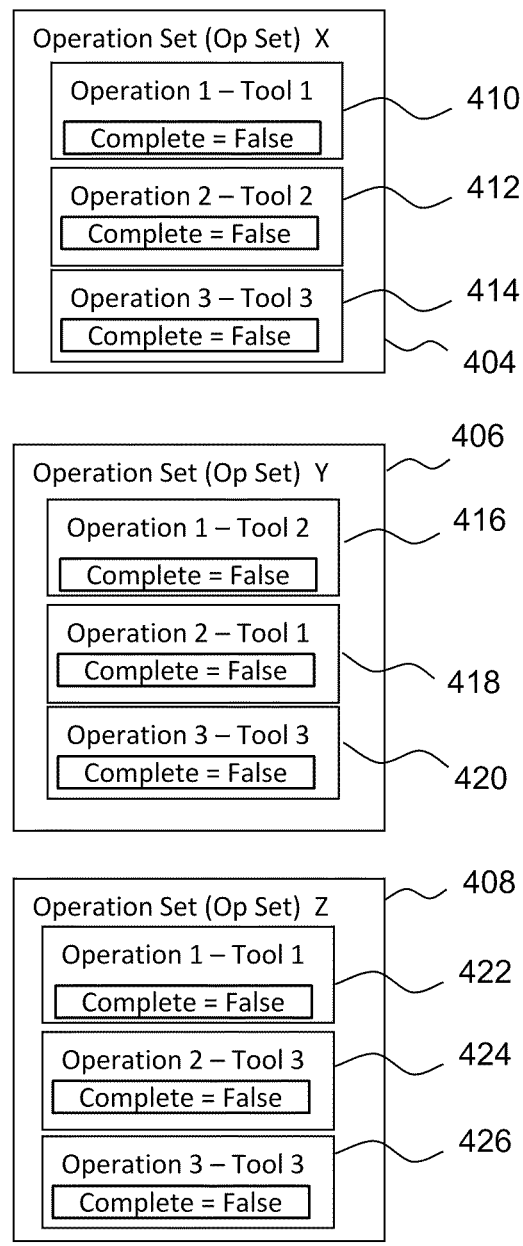
FIGS. 16 and 17 represent one method of generating a final part program.
Figure 17:
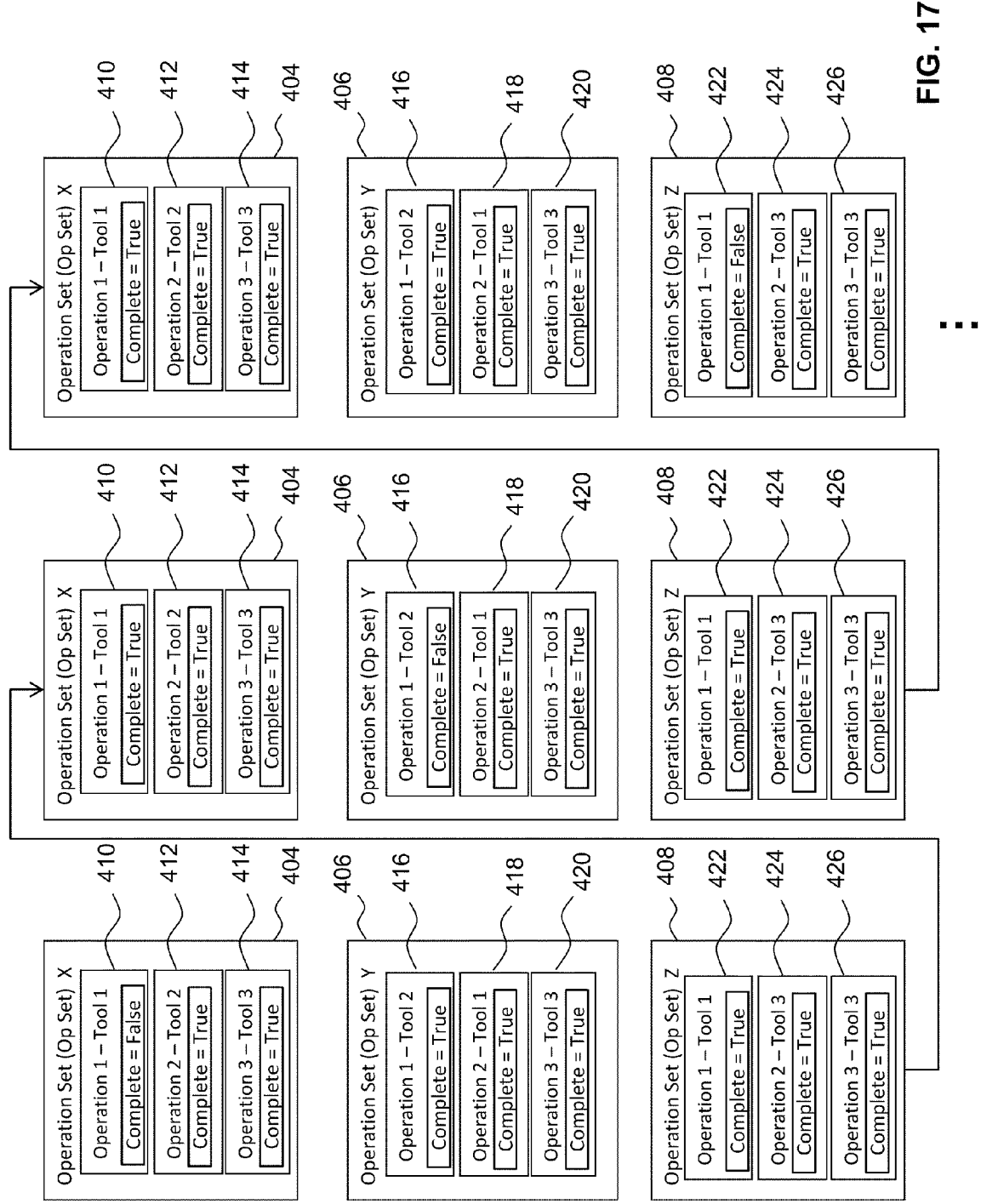

One method of generating final part program 440 is shown in reference to FIGS. 16 and 17. Referring to FIG. 16, the operation sets 404, 406, and 408 of defined part program 400 of FIG. 15A are shown. Each of the operations of the operation sets 404, 406, 408 include a completion flag which is interpreted by machine tool control software 116. When the flag is set to a first value "True", the operation is considered complete and is not performed by machine tool control software 116. When the flag is set to a second value "False", the operation is considered not yet complete and is performed by machine tool control software 116.

With this understanding, final part program 440 may be assembled as shown in FIG. 17. The leftmost column represents operation 410 being added to final part program 440. Each of operation sets 404, 406, and 408 are copied to final part program 440, but only operations 410 has a completion flag set to "True" meaning it will be the only operation performed. The center column represents operation 416 being added to final part program 440. Each of operation sets 404, 406, and 408 are once again copied to final part program 440, but only operations 416 has a completion flag set to "True" meaning it will be the only operation performed. The rightmost column represents operation 422 being added to final part program 440. Each of operation sets 404, 406, and 408 are once again copied to final part program 440, but only operations 422 has a completion flag set to "True" meaning it will be the only operation performed. This continues on down through operation 426 which is the last operation to be added to final part program 440.

While this disclosure has been described as having exemplary designs, the present disclosure can be further modified within the spirit and scope of this disclosure. For example, all of the disclosed components of the preferred and alternative embodiments are interchangeable providing disclosure herein of many systems having combinations of all the preferred and alternative embodiment components. This application is therefore intended to cover any variations, uses, or adaptations of the disclosure using its general principles. Further, this application is intended to cover such departures from the present disclosure as come within known or customary practice in the art to which this disclosure pertains and which fall within the limits of the appended claims.

What is claimed is:

1. A method of programming a machine tool system, the method comprising the steps of:
    receiving a defined part program which includes a plurality of operation sets, each operation set including a plurality of operations, each operation specifying a tool path for the operation and a tool for the operation and belonging to one of a plurality of operation types, the defined part program further including a tool change reduction instruction for each of the plurality of operation types, wherein a sequential execution of the defined part program by the machine tool system requires a first number of tool changes;
    determining a second execution sequence of the operations to require a second number of tool changes by the machine tool system, the second number of tool changes being less than the first number of tool changes, wherein in the second execution sequence an execution order of the plurality of operations within a first operation set is maintained as provided in the defined part program, an execution order of the plurality of operations within a second operation set is maintained as provided in the defined part program, an execution order of each of the plurality of operation types is either maintained or may not be maintained depending upon the tool change reduction instruction corresponding to the operation type, and at least one operation from the second operation set is executed subsequent to a first operation of the first operation set and prior to a second operation of the first operation set; and
    controlling the machine tool system to execute the second execution sequence of the operations, wherein the machine tool system performs the second number of tool changes during the execution of the reordered execution of the operations.

2. The method of claim 1, wherein for a first operation type, the tool change reduction instruction is set to a first value and for a second operation type, the tool change reduction instruction is set to a second value differing from the first value.

3. The method of claim 2, wherein the first operation type is one of a roughing operation, a semi-finish operation, and a finish operation.

4. The method of claim 1, further comprising the step of storing the second execution sequence of the operations in a part file.

5. A method of programming a machine tool system, the method comprising the steps of:
receiving a defined part program which includes a plurality of operation sets, each operation set including a plurality of operations, each operation specifying a tool path for the operation and a tool for the operation, wherein a sequential execution of the defined part program by the machine tool system requires a first number of tool changes;
determining a second execution sequence of the operations to require a second number of tool changes by the machine tool system, the second number of tool changes being less than the first number of tool changes, wherein in the second execution sequence an execution order of the plurality of operations within a first operation set is maintained as provided in the defined part program, an execution order of the plurality of operations within a second operation set is maintained as provided in the defined part program, and at least one operation from the second operation set is executed subsequent to a first operation of the first operation set and prior to a second operation of the first operation set; and
controlling the machine tool system to execute the second execution sequence of the operations, wherein the machine tool system performs the second number of tool changes during the execution of the reordered execution of the operations, wherein each of the plurality of operations belong to one of a plurality of operation types, wherein a tool change reduction instruction is provided for each one of the plurality of operation types, wherein for a first operation type, the tool change reduction instruction is set to a first value and for a second operation type, the tool change reduction instruction is set to a second value differing from the first value, and wherein the first value requires an execution order of the operations which are of the first operation type to be performed in the order presented in the defined part program and the second value permits an execution order of the operations which are of the second operation type to be performed in an order other than the order presented in the defined part program.

6. A method of programming a machine tool system, the method comprising the steps of:
receiving a first group of operations, a plurality of operations in the first group of operations each including path information and tool information and each belonging to one of a plurality of operation types, the plurality of operations including a first operation and a second operation;
receiving a second group of operations, a plurality of operations in the second group of operations each including path information and tool information and each belonging to one of a plurality of operation types, the plurality of operations including a first operation and a second operation;
receiving at least one tool reduction instruction which corresponds to the operation type of at least one of the first operation and the second operation of the plurality of operations of the first group of operations and the first operation and the second operation of the plurality of operations of the second group of operations; and
controlling the machine tool system to perform the plurality of operations of the first group and the plurality of operations of the second group, wherein at least one of the first operation and the second operation of the second group is performed subsequent to the first operation of the first group and prior to the second operation of the first group due to the at least one received tool reduction instruction.

7. The method of claim 6, wherein the tool information for each operation of the first group of operations and the tool information for each operation of the second group of operations specifies a tool for use with the respective operation, the tool being specified for each operation being the tool used when that operation is performed by the machine tool system.

8. The method of claim 6, wherein an execution order of the operations of the first group of operations is maintained and an execution order of the operations of the second group of operations is maintained.

9. The method of claim 6, further comprising receiving a third group of operations, a plurality of operations in the third group of operations each including path information and tool information, the plurality of operations including a first operation and a second operation, the third group of operations being a nested group of operations nested within the first group of operations.

10. The method of claim 9, further comprising breaking out the first group of operations into a plurality of portions, a first portion including the first operation and the second operation and a second portion including the third group of operations.

11. A non-transitory computer readable medium having stored thereon
a first group of operations, a plurality of operations in the first group of operations each including path information and tool information, the plurality of operations including a first operation and a second operation, each belonging to one of a plurality of operation types;
a second group of operations, a plurality of operations in the second group of operations each including path information and tool information, the plurality of operations including a first operation and a second operation, each belonging to one of a plurality of operation types;
at least one tool reduction instruction which corresponds to the operation type of at least one of the first operation and the second operation of the plurality of operations of the first group of operations and the first operation and the second operation of the plurality of operations of the second group of operations; and
software which controls a machine tool system to perform the plurality of operations of the first group of operations and the plurality of operations of the second group of operations, wherein at least one of the first operation and the second operation of the plurality of operations of the second group of operations is performed subsequent to the first operation of the plurality of operations of the first group of the operations and prior to the second operation of the plurality of operations of the first group of operations due to the at least one tool reduction instruction.

12. The non-transitory computer readable medium of claim 11, wherein the tool information for each operation of the first group of operations and the tool information for each operation of the second group of operations specifies a tool for use with the respective operation, the tool being specified for each operation being the tool the software specifies be used when that operation is performed by the machine tool system.

13. The non-transitory computer readable medium of claim 11, wherein the software maintains an execution order of the operations of the first group of operations and maintains an execution order of the operations of the second group of operations.

14. A non-transitory computer readable medium having stored thereon
   a defined part program which includes a plurality of operation sets, each operation set including a plurality of operations, each operation specifying a tool path for the operation and a tool for the operation and belonging to one of a plurality of operation types, the defined part program further including a tool change reduction instruction for each of the plurality of operation types, wherein a sequential execution of the defined part program by the machine tool system requires a first number of tool changes;
   software to determine a second execution sequence of the operations to require a second number of tool changes by the machine tool system, the second number of tool changes being less than the first number of tool changes, wherein in the second execution sequence an execution order of the plurality of operations within a first operation set is maintained as provided in the defined part program, an execution order of the plurality of operations within a second operation set is maintained as provided in the defined part program, an execution order of each of the plurality of operation types is either maintained or may not be maintained depending upon the tool change reduction instruction corresponding to the operation type, and at least one operation from the second operation set is executed subsequent to a first operation of the first operation set and prior to a second operation of the first operation set; and
   software to control the machine tool system to execute the second execution sequence of the operations.

15. The non-transitory computer readable medium of claim 14, wherein the second execution sequence of the operations are stored in a part file.

16. The non-transitory computer readable medium of claim 14, wherein the instructions regarding the reordering of the operations includes a first set of instructions and a second set of instructions, the first set of instructions relating to a first group of the plurality of operation sets and the second set of instructions relating to a second group of the plurality of operation sets.

17. A non-transitory computer readable medium having stored thereon
   a defined part program which includes a plurality of operation sets, each operation set including a plurality of operations, each operation specifying a tool path for the operation and a tool for the operation, wherein a sequential execution of the defined part program by the machine tool system requires a first number of tool changes;
   software to determine a second execution sequence of the operations to require a second number of tool changes by the machine tool system, the second number of tool changes being less than the first number of tool changes, wherein in the second execution sequence an execution order of the plurality of operations within a first operation set is maintained as provided in the defined part program, an execution order of the plurality of operations within a second operation set is maintained as provided in the defined part program, and at least one operation from the second operation set is executed subsequent to a first operation of the first operation set and prior to a second operation of the first operation set; and
   software to control the machine tool system to execute the second execution sequence of the operations, wherein each of the plurality of operations belong to one of a plurality of operation types and wherein a tool change reduction instruction is provided for each one of the plurality of operation types and wherein for a first operation type, the tool change reduction instruction is set to a first value and for a second operation type, the tool change reduction instruction is set to a second value differing from the first value and wherein the software interprets the first value to require an execution order of the operations which are of the first operation type to be performed in the order presented in the defined part program and the second value to permit an execution order of the operations which are of the second operation type to be performed in an order other than the order presented in the defined part program.

* * * * *